United States Patent
Wintz et al.

(10) Patent No.: US 12,211,002 B2
(45) Date of Patent: Jan. 28, 2025

(54) DETERMINING ITEMS TO PICK IN A STORAGE FACILITY

(71) Applicant: Lineage Logistics, LLC, Irvine, CA (US)

(72) Inventors: Daniel Thomas Wintz, San Francisco, CA (US); Daniël Walet, Oakland, CA (US)

(73) Assignee: Lineage Logistics, LLC, Irvine, CA (US)

( * ) Notice: Subject to any disclaimer, the term of this patent is extended or adjusted under 35 U.S.C. 154(b) by 420 days.

(21) Appl. No.: 17/831,390

(22) Filed: Jun. 2, 2022

(65) Prior Publication Data
US 2022/0391828 A1    Dec. 8, 2022

Related U.S. Application Data

(60) Provisional application No. 63/196,167, filed on Jun. 2, 2021.

(51) Int. Cl.
    *G06Q 10/087*    (2023.01)
    *G06Q 10/047*    (2023.01)
    *G06Q 10/0633*   (2023.01)

(52) U.S. Cl.
    CPC ......... *G06Q 10/087* (2013.01); *G06Q 10/047* (2013.01); *G06Q 10/0633* (2013.01)

(58) Field of Classification Search
    CPC .............. G06Q 10/087; G06Q 10/047; G06Q 10/0633; G06Q 10/08
    See application file for complete search history.

(56) References Cited

U.S. PATENT DOCUMENTS

| | | | | |
|---|---|---|---|---|
| 10,657,492 | B1 * | 5/2020 | Wei | G06Q 30/0635 |
| 10,796,278 | B1 * | 10/2020 | Wintz | G06Q 10/0833 |
| 10,809,727 | B1 * | 10/2020 | Eckman | G05D 1/0212 |
| 10,984,378 | B1 * | 4/2021 | Eckman | G06K 19/06131 |

(Continued)

FOREIGN PATENT DOCUMENTS

| | | | |
|---|---|---|---|
| WO | WO 2007/011814 | 1/2007 | |
| WO | WO-2007011814 A2 * | 1/2007 | G06Q 10/08 |

OTHER PUBLICATIONS

International Search Report and Written Opinion in International Appln. No. PCT/US2022/032025, mailed on Sep. 21, 2022, 13 pages.

*Primary Examiner* — Michael Jared Walker
(74) *Attorney, Agent, or Firm* — Barnes & Thornburg LLP

(57) ABSTRACT

Described are systems and methods for identifying an item in a storage facility to fulfill a pick request. The method includes receiving, by a computing system, a request for a physical item of a particular type, identifying a set of available physical items of the particular type from a plurality of physical items stored in storage locations in the storage facility, determining a score for each respective available physical item based on multiple sub-scores specific to the respective available physical item, to generate a set of scores corresponding to the set of available physical items, selecting a selected physical item from among the set based on the selected physical item having a most favorable score, identifying a selected storage location of the selected physical item, and providing instructions to cause a mechanical moving system to route the selected physical item from the selected storage location to a destination picking location.

25 Claims, 21 Drawing Sheets

(56) References Cited

U.S. PATENT DOCUMENTS

| | | | | |
|---|---|---|---|---|
| 11,593,756 B2* | 2/2023 | Sikka | .................... | B65G 1/0492 |
| 2007/0017984 A1* | 1/2007 | Mountz | ................ | G06Q 10/087 |
| | | | | 235/385 |
| 2007/0021863 A1* | 1/2007 | Mountz | ................ | G06Q 10/087 |
| | | | | 700/214 |
| 2007/0021864 A1* | 1/2007 | Mountz | ................ | G06Q 10/087 |
| | | | | 700/216 |
| 2011/0295412 A1* | 12/2011 | Hara | ...................... | G06Q 10/08 |
| | | | | 700/216 |
| 2011/0295413 A1* | 12/2011 | Hara | .................... | G06Q 10/087 |
| | | | | 700/216 |
| 2016/0185528 A1* | 6/2016 | Hara | ...................... | G05B 15/02 |
| | | | | 700/216 |
| 2017/0091704 A1* | 3/2017 | Wolf | ...................... | G06Q 10/08 |
| 2018/0300435 A1* | 10/2018 | Eckman | ................. | G06Q 10/08 |
| 2020/0319648 A1* | 10/2020 | Eckman | ................ | G05D 1/0251 |
| 2021/0150428 A1* | 5/2021 | Walet | .................... | G06Q 10/047 |
| 2021/0150473 A1* | 5/2021 | Wintz | ............... | G06Q 10/06315 |
| 2022/0388783 A1* | 12/2022 | Wintz | ..................... | B65G 1/04 |
| 2022/0391828 A1* | 12/2022 | Wintz | .................. | G06Q 10/087 |

\* cited by examiner

```
                                                    200
```

- Receive request to identify a physical item of a particular type to pick in the storage facility
  202

- Identify set of available physical items of the particular type stored in storage locations in the storage facility
  204

- Select a physical item from the set of available physical items
  206

- Determine a score for the physical item based on multiple sub-scores specific to the physical item
  208
  - Determine a sizing sub-score for the physical item (FIG. 3)
    210
  - Determine a weight sub-score for the physical item (FIG. 4)
    212
  - Determine a maximum weight sub-score for the physical item (FIG. 5)
    214
  - Determine a travel time sub-score for the physical item (FIG. 6)
    216
  - Determine a picking velocity sub-score for the physical item (FIG. 7)
    218

Determine quantity of storage items having a same particular type as the physical item that are stored at a storage location of the physical item
902

↓

Assign type sub-score to the physical item based on the particular type of the physical item
904

↓

Assign more favorable type sub-score to the physical item when (i) the quantity of storage items having the same particular type as the physical item < a particular value than when (ii) the quantity of storage items having the same particular type as the physical item >= the particular value
906

FIG. 9

1100

```
┌─────────────────────────────────────────────────────────────┐
│  Identify a room where a storage location of the physical   │
│                       item is located                       │
│                            1102                             │
└─────────────────────────────────────────────────────────────┘
                              │
                              ▼
┌─────────────────────────────────────────────────────────────┐
│  Receive information about inbound and outbound tasks for a │
│  group of one or more lift mechanisms that service a group  │
│  of storage locations in the identified room that includes  │
│         the storage location of the physical item           │
│                            1104                             │
└─────────────────────────────────────────────────────────────┘
                              │
                              ▼
┌─────────────────────────────────────────────────────────────┐
│  Determine a quantity of tasks queued for the one or more   │
│            lift mechanisms in the identified room           │
│                            1106                             │
│  ┌───────────────────────────────────────────────────────┐  │
│  │ Weight a quantity of outbound tasks more heavily than │  │
│  │             a quantity of inbound tasks               │  │
│  │                         1108                          │  │
│  └───────────────────────────────────────────────────────┘  │
└─────────────────────────────────────────────────────────────┘
                              │
                              ▼
┌─────────────────────────────────────────────────────────────┐
│       Assign task quantity sub-score to the physical item   │
│            based on the quantity of tasks queued            │
│                            1110                             │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   Assign more favorable task quantity sub-score to the
│  physical item when (i) the quantity of tasks queued <    │
   a particular value than when (ii) the quantity of tasks
│              queued > the particular value                │
                              1112
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 11

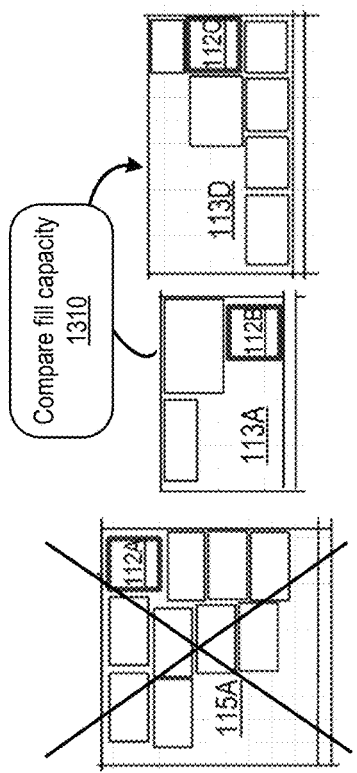
FIG. 13E
FIG. 13G
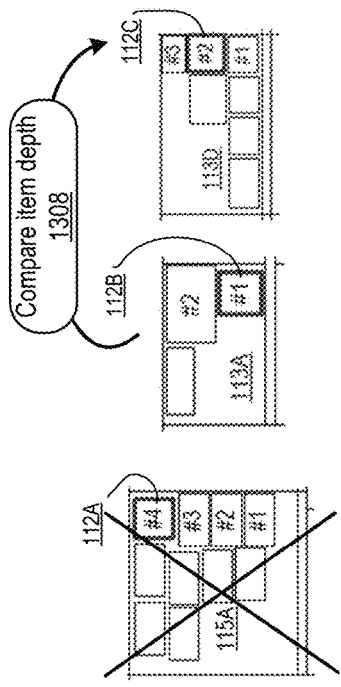
FIG. 13F
FIG. 13H

DETERMINING ITEMS TO PICK IN A STORAGE FACILITY

CROSS-REFERENCE TO RELATED APPLICATIONS

This application claims priority to and the benefit of U.S. Provisional Patent Application No. 63/196,167, filed Jun. 2, 2021, the entire content of which is incorporated herein by reference.

TECHNICAL FIELD

This document describes devices, systems, and methods related to picking physical items in a storage facility.

BACKGROUND

Storage facilities, such as warehouses, receive physical items to be stored for an amount of time before being routed out of the storage facilities. The physical items can include pallets, cases, and other items that can be stored in the facilities before being sent to other destinations. The physical items can be moved around to different areas of the storage facilities. For example, storage facilities can have multiple levels and each level can have multiple storage locations. The facilities can also have multiple aisles with multiple storage locations. Some facilities can have cold storage areas or other temperature-based or characteristic-based storage areas. Some facilities can also have rooms where the physical items can be stored.

The physical items can be moved to storage locations in the facilities for storage. The physical items can remain stored in those storage locations until picking requests are received at the facilities.
The physical items can be moved around the facilities by human workers, forklifts, autonomous vehicles, cranes, carts, robots, or other devices or apparatus that may be used in the storage facilities. Sometimes, the storage facilities can become busy because of an amount of items coming into the facilities, an amount of items leaving the facilities, and/or an amount of items being moved around inside the facilities. Bottlenecks may arise, which can result in traffic inside the storage facilities.

SUMMARY

The document generally relates to technology for determining which physical items to pick to fulfill picking requests in a storage facility, such as a warehouse. The physical item to pick can be determined by a system and based on an aggregation of scores for one or more parameters that may impact a favorability score for that physical item. Some of the parameters can include but are not limited to size of the physical item relative to a storage location of the physical item, weight capacity of the storage location, fill capacity of the storage location, time to transport the physical item from the storage location to a destination picking location, a picking velocity of the physical item relative to other items in the storage location, a number of items queued in front of the physical item in the storage location, a type of the physical item, a number of tasks queued for a room of the storage location, and a number of tasks queued for an aisle servicing the storage location. The parameters can also take into consideration whether moving the physical item may cause impediments or bottlenecks in the storage facility. For example, the parameters can consider whether picking the physical item may require items within the storage location to be shifted or moved around, thereby decreasing a speed at which the picking request can be completed. As another example, the parameters can consider whether picking the physical item may open up space in the storage location to fill with items that are larger in size and/or closer in size to the opening in the storage location, thereby increasing space efficiency in the storage facility.

The physical item can be assigned an aggregate favorability score, based off the one or more parameter sub-scores. The physical item's favorability score can be adjusted relative to favorability scores of other physical items that can be picked to fulfill the picking request. A physical item with the most favorable aggregate score can be selected by the system. The physical item can then be routed from the item's storage location to a destination picking location.

Although the disclosed inventive concepts include those defined in the attached claims, it should be understood that the inventive concepts can also be defined in accordance with the following embodiments.

Embodiment 1 is a method to identify an item in a storage facility to fulfill a pick request, the method comprising: receiving, by a computing system, a request for a physical item of a particular type; identifying, by the computing system, a set of available physical items of the particular type from among a plurality of physical items stored in a plurality of storage locations in the storage facility; determining, by the computing system, a score for each respective available physical item of the particular type from the set of available physical items of the particular type based on multiple sub-scores specific to the respective available physical item of the particular type, to generate a set of scores corresponding to the set of available physical items of the particular type; selecting, by the computing system, a selected physical item from among the set of available physical items of the particular type based on the selected physical item having a most favorable score from among the set of scores corresponding to the set of available physical items of the particular type; identifying, by the computing system, a selected storage location at which the selected physical item is located; and providing, by the computing system, instructions to cause a mechanical moving system to route the selected physical item from the selected storage location to a destination picking location.

Embodiment 2 is the method of embodiment 1, further comprising determining, by the computing system for each respective available physical item of the available physical items, a sizing sub-score of the multiple sub-scores that are used to determine the score for the respective available physical item by: identifying, by the computing system, a size of the respective available physical item; identifying, by the computing system, a size of a storage location of the respective available physical item; determining, by the computing system, an amount that the size of the storage location of the respective available physical item is larger than the size of the respective available physical item; and assigning, by the computing system, the sizing sub-score to the respective available physical item based on the amount that the size of the storage location of the respective available physical item is larger than the size of the respective available physical item, wherein the computing system is configured to assign a more favorable sizing sub-score to the respective available physical item when (i) the amount that the size of the storage location of the respective available physical item is larger than the size of the respective available physical item exceeds a particular value than when, (ii) the amount that the size of the storage location of the respective available physical item is larger than the size of the respective available physical item is less than or equal to the particular value, wherein the size of the respective available physical item falls within a range from a minimum size of the storage location of the respective available physical location to a maximum size of the respective available physical storage location.

Embodiment 3 is the method of any one of embodiments 1 or 2, further comprising determining for each respective available physical item of the available physical items, by the computing system, a weight sub-score of the multiple sub-scores that are used to determine the score for the respective available physical item by: identifying, by the computing system, a weight of the respective available physical item; identifying, by the computing system, a maximum weight capacity of a storage location of the respective available physical item; identifying, by the computing system, an aggregate weight of items currently stored at the storage location; determining, by the computing system, a remaining weight capacity of the storage location based on a difference between the maximum weight capacity and the aggregate weight of the items currently stored at the storage location; determining, by the computing system, an amount that the remaining weight capacity of the storage location exceeds the weight of the respective available physical item; and assigning, by the computing system, the weight sub-score based on the amount that the remaining weight capacity of the storage location exceeds the weight of the respective available physical item.

Embodiment 4 is the method of any one of embodiments 1 through 3, wherein the computing system is configured to assign a more favorable weight sub-score to the respective available physical item when (i) the amount that the remaining weight capacity of the storage location exceeds the weight of the respective available physical item is greater than a particular value than when (ii) the amount that the remaining weight capacity of the storage location exceeds the weight of the respective available physical item is less than or equal to the particular value.

Embodiment 5 is the method of any one of embodiments 1 through 4, further comprising determining, by the computing system for each respective available physical item of the available physical items, a maximum weight sub-score of the multiple sub-scores that are used to determine the score for the respective available physical item by: identifying, by the computing system, a weight of the respective available physical item; identifying, by the computing system, a maximum weight capacity of a storage location of the respective available physical item; identifying, by the computing system, a maximum number of items that can be stored at the storage location of the respective available physical item; determining, by the computing system, a maximum weight per item based on dividing the maximum weight capacity of the storage location by the maximum number of items that can be stored at the storage location; and assigning, by the computing system, the maximum weight sub-score to the respective available physical item based on the weight of the respective available physical item exceeding the maximum weight per item that can be stored at the storage location, wherein the computing system is configured to assign a more favorable maximum weight sub-score to the respective available physical item when (i) the weight of the respective available physical item exceeds the maximum weight per item than when, (ii) the weight of the respective available physical item is less than or equal to the maximum weight per item.

Embodiment 6 is the method of any one of embodiments 1 through 5, further comprising determining, by the computing system for each respective available physical item of the available physical items, a travel time sub-score of the multiple sub-scores that are used to determine the score for the respective available physical item by: determining, by the computing system, a first projected travel time between a storage location of the respective available physical item and the destination picking location; determining, by the computing system, a second projected travel time between another storage location of another available physical item and the destination picking location; and assigning, by the computing system, the travel time sub-score to the respective available physical item based on the first projected travel time being less than the second projected travel time, wherein the computing system is configured to assign a more favorable travel time sub-score to the respective available physical item when (i) the first projected travel time is less than the second projected travel time than when, (ii) the first projected travel time is greater than the second projected travel time.

Embodiment 7 is the method of any one of embodiments 1 through 6, wherein assigning the travel time sub-score to the respective available physical item is based on (i) a wait time for storage items in a queue, (ii) a wait time for storage items at one or more lift mechanisms, (iii) a travel time for storage items in one or more lift mechanisms, (iv) a travel time for storage items through one or more mechanical moving systems, (v) an amount of traffic of storage items in the storage facility, (vi) an amount of time needed to pick the respective available physical item before routing the available physical item to the destination picking location, or (vii) an actual distance between the storage location of the respective available physical item and the destination picking location.

Embodiment 8 is the method of any one of embodiments 1 through 7, further comprising determining, by the computing system for each respective available physical item of the available physical items, a picking velocity sub-score of the multiple sub-scores that are used to determine the score for the respective available physical item by: identifying, by the computing system, multiple items currently stored in a storage location of the respective available physical item; determining, by the computing system, a statistical likelihood that each of the multiple items currently stored in the storage location is likely to be picked in the future; determining, by the computing system, positions for each of the multiple items currently stored in the storage location, wherein the storage location has a plurality of positions, wherein each of the plurality of positions is assigned a numeric value, wherein a smaller numeric value corresponds to a position closer to a front of the storage location and a larger numeric value corresponds to a position closer to a back of the storage location; determining, by the computing system, a picking rate of the respective available physical item; determining, by the computing system, a position of the respective available physical item in the storage location relative to each of the multiple items currently stored in the storage location; and assigning, by the computing system, the picking velocity sub-score to the respective available physical item based on the picking rate and the position of the respective available physical item, wherein the computing system is configured to assign a more favorable picking velocity sub-score to the respective available physical item when (i) the picking rate of the respective available physical item exceeds the statistical likelihood that each of the multiple items currently stored at the storage location is likely to be picked in the future and (ii) the position of the respective available physical item is less than the positions for each of the multiple items currently stored in the storage location than when, (iii) the picking rate of the respective available physical item exceeds the statistical likelihood that each of the multiple items currently stored at the storage location is likely to be picked in the future and (iv) the position of the respective available physical item is greater than the positions for each of the multiple items currently stored in the storage location.

Embodiment 9 is the method of any one of embodiments 1 through 8, further comprising determining, by the computing system for each respective available physical item of the available physical items, an item depth sub-score of the multiple sub-scores that are used to determine the score for the respective available physical item by: identifying, by the computing system, a total quantity of items currently stored in a storage location of the respective available physical item; determining, by the computing system, a quantity of the total quantity of items currently stored in the storage location in a queue in front of the respective available physical item; and assigning, by the computing system, the item depth sub-score to the respective available physical item based on the quantity of items in the queue in front of the respective available physical item, wherein the computing system is configured to assign a more favorable item depth sub-score to the respective available physical item when (i) the quantity of the items in the queue in front of the respective available physical item is less than a particular value than when, (ii) the quantity of the items in the queue in front of the respective available physical items is greater than the particular value.

Embodiment 10 is the method of any one of embodiments 1 through 9, further comprising determining, by the computing system for each respective available physical item of the available physical items, a type sub-score of the multiple sub-scores that are used to determine the score for the respective available physical item by: determining, by the computing system, a quantity of storage items having a same particular type as the respective available physical item that are stored at a storage location of the respective available physical item; and assigning, by the computing system, the type sub-score to the respective available physical item based on the particular type of the respective available physical item, wherein the computing system is configured to assign a more favorable type sub-score to the respective available physical item when (i) the quantity of the storage items having the same particular type as the respective available physical item is less than a particular value than when, (ii) the quantity of the storage items having the same particular type as the respective available physical item is greater than or equal to the particular value.

Embodiment 11 is the method of any one of embodiments 1 through 10, wherein identifying storage items having the same particular type as the respective available physical item comprises identifying storage items having at least one of a same perishable date, storage temperature, SKU, customer identifier, product, outbound date, and delivery date as the available physical item.

Embodiment 12 is the method of any one of embodiments 1 through 11, further comprising determining, by the computing system for each respective available physical item of the available physical items, a fill capacity sub-score of the multiple sub-scores that are used to determine the score for the respective available physical item by: determining, by the computing system, a quantity of storage items currently stored at a storage location of the respective available physical item; determining, by the computing system, a total number of storage items that can be stored at the storage location of the respective available physical item; determining, by the computing system, an amount of fill capacity for the storage location based on comparing the quantity of storage items currently stored to the total number of storage items that can be stored at the storage location; and assigning, by the computing system, the fill capacity sub-score to the respective available physical item based on the amount of fill capacity, wherein the computing system is configured to assign a more favorable fill capacity sub-score to the respective available physical item when (i) the amount of fill capacity is less than a particular value than when, (ii) the amount of fill capacity is greater than or equal to the particular value, wherein the computing system is configured to assign a most favorable fill capacity sub-score to the respective available physical item when the amount of fill capacity is 0 and assign a least favorable fill capacity sub-score to the respective available physical item when the amount of fill capacity is 100.

Embodiment 13 is the method of any one of embodiments 1 through 12, further comprising: determining, by the computing system, a quantity of storage items having a same particular type as the respective available physical item that are stored at a storage location of the respective available physical item; and assigning a more favorable fill capacity sub-score to the respective available physical item when (i) the quantity of the storage items having the same particular type as the respective available physical item is less than a first particular value and (ii) the amount of fill capacity is greater than or equal to a second particular value than when, (iii) the quantity of the storage items having the same particular type as the respective available physical item is greater than the first particular value and (iv) the amount of fill capacity is less than the second particular value.

Embodiment 14 is the method of any one of embodiments 1 through 13, further comprising: identifying, by the computing system, storage items having a different type than the particular type of the respective available physical item that are currently stored at the storage location; determining, by the computing system and for each of the different types, a quantity of the storage items of each different type; and assigning a more favorable fill capacity sub-score to the respective available physical item when (i) a first quantity of the storage items of a first different type is less than a second quantity of the storage items of a second different type and (ii) the amount of fill capacity is greater than or equal to a particular value than when, (iii) the first quantity of the storage items of the first different type is greater than the second quantity of the storage items of the second different type and (iv) the amount of fill capacity is less than the particular value.

Embodiment 15 is the method of any one of embodiments 1 through 14, further comprising determining, by the computing system for each respective available physical item of the available physical items, a task quantity sub-score of the multiple sub-scores that are used to determine the score for the respective available physical item by: identifying, by the computing system, a room where a storage location of the respective available physical item is located; receiving, by the computing system, information about inbound and outbound tasks for a group of one or more lift mechanisms that service a group of storage locations in the identified room that includes the storage location of the respective available physical item; determining, by the computing system and based on the information about the inbound and outbound tasks for the group of the one or more lift mechanisms, a quantity of tasks queued for the one or more lift mechanisms in the identified room; and assigning, by the computing system, the task quantity sub-score to the respective available physical item based on the quantity of tasks queued for the one or more lift mechanisms in the identified room, wherein the computing system is configured to assign a more favorable task quantity sub-score to the respective available physical item when (i) the quantity of tasks queued for the one or more lift mechanisms in the identified room is less than a particular value than when, (ii) the quantity of tasks queued for the one or more lift mechanisms in the identified room is greater than the particular value.

Embodiment 16 is the method of any one of embodiments 1 through 15, wherein determining the quantity of tasks queued for the one or more lift mechanisms in the identified room comprises weighting a quantity of outbound tasks more heavily than a quantity of inbound tasks for the one or more lift mechanisms in the identified room.

Embodiment 17 is the method of any one of embodiments 1 through 16, further comprising determining, by the computing system for each respective available physical item of the available physical items, an aisle task sub-score of the multiple sub-scores that are used to determine the score for the respective available physical item by: identifying, by the computing system, a room where a storage location of the respective available physical item is located; selecting, by the computing system, an aisle in the room that is used to access the storage location of the available physical item, wherein the room includes a plurality of aisles corresponding to a plurality of levels in the room, wherein each of the plurality of aisles has one or more different storage locations; receiving, by the computing system, information about inbound and outbound tasks for the selected aisle; determining, by the computing system and based on the information about the inbound and outbound tasks for the selected aisle, a quantity of tasks queued for the selected aisle; and assigning, by the computing system, the aisle task sub-score to the respective available physical item based on the quantity of tasks queued for the selected aisle, wherein the computing system is configured to assign a more favorable aisle task sub-score to the respective available physical item when (i) the quantity of tasks queued for the selected aisle is less than a particular value than when, (ii) the quantity of tasks queued for the selected aisle is greater than the particular value.

Embodiment 18 is the method of any one of embodiments 1 through 17, wherein assigning the aisle task sub-score to the respective available physical item is further based on (i) a number of storage items permitted in the selected aisle at a given time, (ii) sizes of storage items currently being moved in the selected aisle, (iii) weights of storage items currently being moved in the selected aisle, (iv) types of storage items currently being moved in the selected aisle, or (v) a projected traffic time in the selected aisle, wherein the projected traffic time is based at least in part on real-time traffic conditions received, by the computing system and from a plurality of sensors in the storage facility.

Embodiment 19 is a a system for identifying an item in a storage facility to fulfill a pick request, the system comprising: a plurality of physical items in the storage facility; a mechanical moving system configured to route the plurality of physical items to destination locations in the storage facility; and a computing system configured to: receive a request for a physical item of a particular type; identify a set of available physical items of the particular type from among the plurality of physical items stored in a plurality of storage locations in the storage facility; determine a score for each respective available physical item of the particular type from the set of available physical items of the particular type based on multiple sub-scores specific to the respective available physical item of the particular type, to generate a set of scores corresponding to the set of available physical items of the particular type; select a selected physical item from among the set of available physical items of the particular type based on the selected physical item having a most favorable score from among the set of scores corresponding to the set of available physical items of the particular type; identify a selected storage location at which the selected physical item is located; and provide instructions to cause the mechanical moving system to route the selected physical item from the selected storage location to a destination picking location.

Embodiment 20 is the system of embodiment 19, wherein the computing system is further configured to determine, for each respective available physical item of the available physical items, a sizing sub-score of the multiple sub-scores that are used to determine the score for the respective available physical item by: identifying a size of the respective available physical item; identifying a size of a storage location of the respective available physical item; determining an amount that the size of the storage location of the respective available physical item is larger than the size of the respective available physical item; and assigning the sizing sub-score to the respective available physical item based on the amount that the size of the storage location of the respective available physical item is larger than the size of the respective available physical item, wherein the computing system is configured to assign a more favorable sizing sub-score to the respective available physical item when (i) the amount that the size of the storage location of the respective available physical item is larger than the size of the respective available physical item exceeds a particular value than when, (ii) the amount that the size of the storage location of the respective available physical item is larger than the size of the respective available physical item is less than or equal to the particular value, wherein the size of the respective available physical item falls within a range from a minimum size of the storage location of the respective available physical location to a maximum size of the respective available physical storage location.

Embodiment 21 is the system of any one of embodiments 19 or 20, wherein the computing system is further configured to determine, for each respective available physical item of the available physical items, a weight sub-score of the multiple sub-scores that are used to determine the score for the respective available physical item by: identifying a weight of the respective available physical item; identifying a maximum weight capacity of a storage location of the respective available physical item; identifying an aggregate weight of items currently stored at the storage location; determining a remaining weight capacity of the storage location based on a difference between the maximum weight capacity and the aggregate weight of the items currently stored at the storage location; determining an amount that the remaining weight capacity of the storage location exceeds the weight of the respective available physical item; and assigning the weight sub-score based on the amount that the remaining weight capacity of the storage location exceeds the weight of the respective available physical item.

Embodiment 22 is the system of any one of embodiments 19 through 21, wherein the computing system is further configured to determine, for each respective available physical item of the available physical items, a travel time sub-score of the multiple sub-scores that are used to determine the score for the respective available physical item by: determining a first projected travel time between a storage location of the respective available physical item and the destination picking location; determining a second projected travel time between another storage location of another available physical item and the destination picking location; and assigning the travel time sub-score to the respective available physical item based on the first projected travel time being less than the second projected travel time, wherein the computing system is configured to assign a more favorable travel time sub-score to the respective available physical item when (i) the first projected travel time is less than the second projected travel time than when, (ii) the first projected travel time is greater than the second projected travel time.

Embodiment 23 is the system of any one of embodiments 19 through 22, wherein the computing system is further configured to determine, for each respective available physical item of the available physical items, a picking velocity sub-score of the multiple sub-scores that are used to determine the score for the respective available physical item by: identifying multiple items currently stored in a storage location of the respective available physical item; determining a statistical likelihood that each of the multiple items currently stored in the storage location is likely to be picked in the future; determining positions for each of the multiple items currently stored in the storage location, wherein the storage location has a plurality of positions, wherein each of the plurality of positions is assigned a numeric value, wherein a smaller numeric value corresponds to a position closer to a front of the storage location and a larger numeric value corresponds to a position closer to a back of the storage location; determining a picking rate of the respective available physical item; determining a position of the respective available physical item in the storage location relative to each of the multiple items currently stored in the storage location; and assigning the picking velocity sub-score to the respective available physical item based on the picking rate and the position of the respective available physical item, wherein the computing system is configured to assign a more favorable picking velocity sub-score to the respective available physical item when (i) the picking rate of the respective available physical item exceeds the statistical likelihood that each of the multiple items currently stored at the storage location is likely to be picked in the future and (ii) the position of the respective available physical item is less than the positions for each of the multiple items currently stored in the storage location than when, (iii) the picking rate of the respective available physical item exceeds the statistical likelihood that each of the multiple items currently stored at the storage location is likely to be picked in the future and (iv) the position of the respective available physical item is greater than the positions for each of the multiple items currently stored in the storage location.

Embodiment 24 is the system of any one of embodiments 19 through 23, wherein the computing system is further configured to determine, for each respective available physical item of the available physical items, a task quantity sub-score of the multiple sub-scores that are used to determine the score for the respective available physical item by: identifying a room where a storage location of the respective available physical item is located; receiving information about inbound and outbound tasks for a group of one or more lift mechanisms that service a group of storage locations in the identified room that includes the storage location of the respective available physical item; determining, based on the information about the inbound and outbound tasks for the group of the one or more lift mechanisms, a quantity of tasks queued for the one or more lift mechanisms in the identified room; and assigning the task quantity sub-score to the respective available physical item based on the quantity of tasks queued for the one or more lift mechanisms in the identified room, wherein the computing system is configured to assign a more favorable task quantity sub-score to the respective available physical item when (i) the quantity of tasks queued for the one or more lift mechanisms in the identified room is less than a particular value than when, (ii) the quantity of tasks queued for the one or more lift mechanisms in the identified room is greater than the particular value.

Embodiment 25 is the system of any one of embodiments 19 through 24, wherein the computing system is further configured to determine, for each respective available physical item of the available physical items, an aisle task sub-score of the multiple sub-scores that are used to determine the score for the respective available physical item by: identifying a room where a storage location of the respective available physical item is located; selecting an aisle in the room that is used to access the storage location of the available physical item, wherein the room includes a plurality of aisles corresponding to a plurality of levels in the room, wherein each of the plurality of aisles has one or more different storage locations; receiving information about inbound and outbound tasks for the selected aisle; determining, based on the information about the inbound and outbound tasks for the selected aisle, a quantity of tasks queued for the selected aisle; and assigning the aisle task sub-score to the respective available physical item based on the quantity of tasks queued for the selected aisle, wherein the computing system is configured to assign a more favorable aisle task sub-score to the respective available physical item when (i) the quantity of tasks queued for the selected aisle is less than a particular value than when, (ii) the quantity of tasks queued for the selected aisle is greater than the particular value.

The disclosed technology may provide one or more of the following technological advantages and effects. For example, the disclosed technology can reduce bottlenecks in a storage facility. A physical item can be picked to fulfill a picking request based on how much traffic exists or may exist along a route to a storage location of the physical item. The disclosed technology can also compare traffic or other congestion information for traveling to different storage locations in order to determine which storage location has the least busy route. The traffic can be associated with inbound and outbound tasks associated with the storage location of the physical item. A physical item that is stored in a storage location having a route with traffic can receive a less favorable score than a physical item that is stored in a storage location having a route free of traffic. The disclosed technology can provide for selection of the physical item having the route free of traffic. Therefore, movement through the storage facility can be optimized, bottlenecks and congestion can be avoided, and traffic along one or more routes in the facility can be minimized. As such, energy usage by mechanical moving systems within the storage facility can be minimized.

Similarly, a physical item can be picked based on a travel distance between a storage location of the physical item and a destination picking location. Minimizing the travel distance can be advantageous to improve warehouse efficiency, improve picking rates, and complete orders or picking requests on time. Travel distance can also be minimized both in moving to the physical item in its storage location and moving the physical item from its storage location to the destination picking location. Minimizing the travel distance in both directions can also be advantageous to minimize or prevent congestion in aisles of the facility with regards to both inbound and outbound tasks.

As another example, the disclosed technology can provide for improving overall facility efficiency. As mentioned above, traffic can be avoided or minimized. Therefore, inbound and outbound items can be moved more quickly throughout the facility. Storage space can also be optimized. Physical items can be picked to clear out storage locations where the characteristics of the physical items mismatch with characteristics of the storage locations. For example, a physical item can be selected for picking based on how good of a fit the physical item is in its associated storage location. In other words, if the physical item's size is too small for a size of open space in the storage location, the physical item can be assigned a more favorable score than a physical item that has a size that matches a size of an open space in another storage location. Thus, the physical item having a greatest disparity in sizing with its storage location (e.g., the more favorable score) can be selected to fulfill the picking request. Removing the physical item from its storage location can therefore free up space in the storage location, which can then be filled by items that are a better fit. This can improve space efficiency and overall efficiency in the storage facility.

As another example, picking rates in the facility can be maintained and/or improved. A physical item can be selected to fulfill a picking request based on the physical item having a lower picking rate than other items currently stored at a storage location of the physical item. In other words, if the physical item is going to be picked after the currently stored items and the physical item is positioned in front of one or more of the currently stored items, then selecting the physical item can ensure that picking rates of the other currently stored items may not be compromised. Fast-rotating storage locations can then be cleared out before locations that have slower picking rates and/or movement of stored items. After all, leaving the physical item in its current position can prevent the other currently stored items from being picked efficiently and on time.

The disclosed technology can also provide for grouping of items based on type in storage locations. A physical item can be selected to fulfill a picking request based on the physical item being stored in a storage location with items of different types. It can be advantageous to store items of like type in a storage location to improve efficiency in picking items of the same type. Therefore, if a physical item is stored amongst items of different types, selecting the physical item can provide for the storage location to then be filled with more items of the same type.

Moreover, the disclosed technology can provide for a holistic approach to selecting a physical item to fulfill a picking request. As described herein, one or more parameters can be scored per available physical item in the facility. The parameter scores can be compared relative to parameter scores of other available physical items to determine the optimal or most favorable physical item to select for the picking request. Doing so can provide for optimizing space in the facility, avoiding bottlenecks, and improving overall efficiency of the facility.

The details of one or more implementations are set forth in the accompanying drawings and the description below. Other features and advantages will be apparent from the description and drawings, and from the claims.

BRIEF DESCRIPTION OF THE DRAWINGS

FIGS. 2A-C is a flowchart of a process for selecting the physical item to fulfill the picking request.

FIG. 9 is a flowchart of a process for determining a type sub-score for the physical item.

FIG. 11 is a flowchart of a process for determining a task quantity sub-score for the physical item.

FIG. 13E depicts using the item depth sub-score of FIG. 8 when selecting the physical item for the picking request.

FIG. 13F depicts using the fill capacity sub-score of FIG. 10 when selecting the physical item for the picking request.

FIG. 13G depicts using the aisle task sub-score of FIGS. 12A-B when selecting the physical item for the picking request.

FIG. 13H depicts using the task quantity sub-score of FIG. 11 when selecting the physical item for the picking request.

Like reference symbols in the various drawings indicate like elements.

DETAILED DESCRIPTION OF ILLUSTRATIVE EMBODIMENTS

Figure 1:
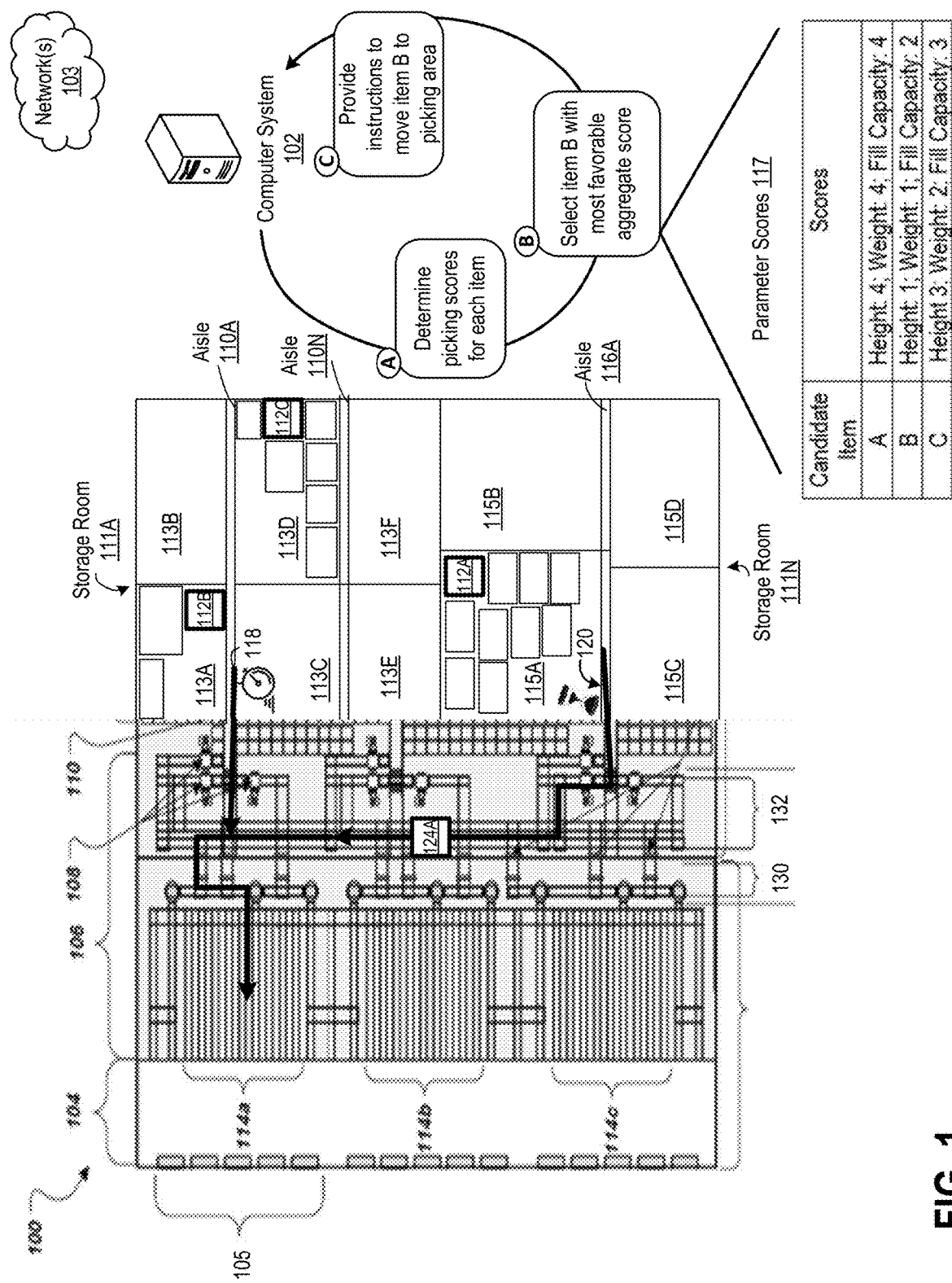
FIG. 1 is a conceptual diagram of a system for selecting a physical item to fulfill a picking request in a warehouse.

This document generally relates to technology for selecting a physical item to pick to fulfill a picking request in a storage facility, such as a warehouse. In a manual and/or automated warehouse, the disclosed technology can be used to determine which currently stored physical item to pick to fulfill a picking request. When an order is placed in the facility, several physical items can fulfill that order. Physical items in the facility with the same characteristics as what is requested in the picking request (e.g., owner, item, SKU, order date, code date, other allocation attributes, etc.) can be scored to determine a most favorable physical item to pick. The more favorable physical item can be one that, when removed, can maintain a high filling degree in the facility with minimal reshuffle. The disclosed technology can be used to determine which of the items from the set of identical pallets can be picked to fulfill the order. Thus, the disclosed technology can be used to determine a current optimal stored physical item to choose for an outbound order or replenishment task. This can occur after an order is placed, for example.

In some implementations, such as in an automated warehouse, the disclosed technology can determine which physical item to select just before dispatching a crane, cart, or other warehouse vehicle to retrieve an item from a storage location. Therefore, most recent information about the warehouse and other factors can be taken into consideration in determining the best physical item to pick. In some implementations, the disclosed technology can also be implemented as soon as a transport order for a physical item is received at the warehouse (e.g., at a warehouse management system). The disclosed technology can be used as many times as may be necessary for a physical item. In some implementations, a warehouse management system (WMS) can be configured to reserve a group of physical items for an order that needs to be fulfilled. The WMS can also manage orders and stock. The disclosed technology can then be used to select which item amongst the group of physical items is most favorable for picking to fulfill the order. The disclosed technology can be used to make dynamic, real-time determinations when picking items. Thus, selection or allocation of a physical item can be performed at a time of fulfilling an order.

The disclosed technology can provide for minimizing travel distance, both getting to the selected item and moving the selected item to a destination picking location (e.g., dock lane, staging area, staging lane), reducing or preventing congestion in aisles of the facility, clearing out fast-rotating storage locations first, and clearing out locations where item type or characteristics mismatch with storage location characteristics (e.g., small item in a tall storage location).

A physical item can be selected based on a plurality of parameters that can be scored for the physical item relative to similar parameters of other available physical items that can be picked in the warehouse. Then, the physical item having a most favorable scoring can be selected and the physical item can be routed from the physical item's storage location to a destination picking location. When throughput permits in the facility, a more favorable score (e.g., lowest cost) can be assigned to physical items from a storage perspective, such that a higher actual filing degree can be maintained with minimal reshuffle in the facility. In some implementations, the disclosed technology can also be configured such that high throughput is requested or desired in the facility. In such implementations, a more favorable score (e.g., lowest cost) can be assigned to easier to access physical items, such that staging can be accomplished on time in the facility.

As described herein, each available physical item in the facility can be assigned a favorability score for being picked. Different parameters or characteristics of each physical item can be weighted into the score such that the physical item having the most favorable score (e.g., a lowest cost to be picked) can be selected to fulfill a picking request. Some of the parameters that are weighted in the favorability score include but are not limited to height/size of a storage location that stores the physical item, height of the item, maximum weight the storage location of the item can carry, weight of the item, picking rate of other items stored in the storage location, picking rate of the item, distance from the storage location of the item to a destination picking location, whether the storage location stores items of a same type as the physical item, whether keeping the item in the storage location would cause inefficiencies in moving other items currently stored in the storage location, a number of currently stored items that are in front of the physical item, a fill capacity of the item's storage location, a number of tasks assigned to a room of the storage location, a number of tasks assigned to an aisle that services the storage location, a maximum number of items that can fit in the storage location, a type of the storage location, and other information associated with other inbound and outbound tasks.

Any combination of these parameters can be weighted to determine the favorability score for each of the available physical items. Moreover, values of the weighted parameters can vary per facility or warehouse. In some implementations, if a certain weighted parameter is not relevant to a particular facility, then that parameter may not be included in determining the favorability score for each of the available physical items in the particular facility.

Referring to the figures, FIG. 1 is a conceptual diagram of a system for selecting a physical item to fulfill a picking request in a warehouse 100. A computer system 102 can be in communication with one or more components of the warehouse 100 (e.g., a warehouse management system, user devices, forklifts, lift mechanisms, conveyor belts, mechanical moving systems) via network(s) 103. The computer system 102 can be configured to select a physical item to fulfill a picking request based on weighing one or more parameters about the physical item relative to parameters about other physical items that can be picked to fulfill the picking request.

The warehouse 100 can include a docking area 104 having docking bays 105. Inbound items can be delivered to the docking area 104 by trucks that station at the bays 105. The inbound items can be routed through the warehouse 100 for storage in one or more storage locations. Items that are picked (e.g., outbound items) can also be routed to the docking area 104 and/or one or more other staging areas. The picked items can then be loaded onto trucks at the bays 105. The warehouse 100 has a mechanical moving system 106, which can include conveyor belts 114A-C, 130, and 132. The mechanical moving system 106 can also include lift mechanisms (e.g., elevators) 108 that can be used to move items to different levels of the warehouse 100. The warehouse 100 has a storage area 110, which can include storage rooms 111A-N. Each of the storage rooms 111A-N can have multiple aisles and multiple storage locations. Each of the multiple aisles can be associated with different levels in the storage rooms 111A-N. Moreover, each of the multiple aisles can be used to access the multiple storage locations.

As depicted in FIG. 1, the storage room 111A has two aisles, 110A and 110N. The aisle 110A services storage locations 113A and 113B. The aisle 110N services storage locations 113C, 113D, 113E, and 113F. The storage room 111N has one aisle 116A. The aisle 116A services storage locations 115A, 115B, 115C, and 115D. Each of the storage rooms 111A and 111N can have one or more additional or fewer aisles and/or storage locations. Moreover, the warehouse 100 can include one or more additional or fewer storage locations.

Each of the aisles 110A-110N and 116A can have one or more carts, cranes, forklifts, or other warehouse vehicles configured to move items (e.g., items 112A, 112B, 112C, and 124A) up and down the aisles to the storage locations along the aisles. In some implementations, the storage locations 113A, 113B, 113C, 113D, 113E, 113F, 115A, 115B, 115C, and 115D can be five rows deep for storing multiple items at a time. The storage locations can also have one or more different depth configurations. Moreover, the storage locations can be of different types, such as last-in-first-out (LIFO) and first-in-first-out (FIFO). Once a physical item is selected to fulfill a picking request, a cart associated with an aisle that leads to the storage location of the physical item can be instructed to retrieve the physical item.

As depicted in FIG. 1, the computer system 102 can determine a physical item amongst items 112A, 112B, and 112C to select to fulfill a picking request. The items 112A-C can be a pallet, boxes of items, container, or any other physical item for storage in the warehouse 100. The items 112A-C can have same characteristics required for the picking request. Therefore, any of the items 112A-C can be picked to fulfill the picking request. As mentioned, the items 112A-C can be grouped by the warehouse management system (not depicted) before the picking request is received. The computer system 102 can then use the group to determine which of the items 112A-C is most favorable to pick. The computer system 102, therefore, may not have to determine which of all the items currently stored in the warehouse 100 can be picked to fulfill the picking request.

In the example of FIG. 1, the computer system 102 can determine picking scores for the items 112A-C (Item A in FIG. 1). In other words, the computer system 102 can determine scores for one or more parameters for each of the candidate physical items 112A-C. The computer system 102 can determine an overall favorability score for each of the candidate items 112A-C based on weighting the parameter scores relative to the parameter scores of each of the candidate items 112A-C. As described herein, the parameters can include a fill capacity, weight, and size for each of the candidate items 112A-C. One or more fewer or additional parameters can also be used to determine an overall favorability score for each of the candidate items 112A-C.

Based on the parameter scores determined for each of the candidate items 112A-C, the computer system 102 can select candidate physical item 112B as having a most favorable aggregate score for being picked (Item B). The most favorable score can be a lowest value score (e.g., 1) and a least favorable score can be a highest value score (e.g., 5, or any other number on a chosen favorability scale). In other implementations, the most favorable score can be a highest value score (e.g., 100) and a lowest favorable score can be a lowest value score (e.g., 0, or any other number or value on a chosen favorability scale). A most favorable score can indicate that the physical item is the worst fit for its associated storage location. Removing or picking that item can therefore free up the space in the storage location to be more efficiently used.

In the example of FIG. 1, scores are determined on a scale of 1-5, with 1 being most favorable and 5 being least favorable. Parameter scores table 117 indicates parameter scores for each of the candidate physical items. Candidate item 112A in storage location 115A has a height score of 4, a weight score of 4, and a fill capacity score of 4. Candidate item 112B in storage location 113A has a height score of 1, a weight score of 1, and a fill capacity score of 2. Candidate item 112C in storage location 113D has a height score of 3, a weight score of 2, and a fill capacity score of 3.

The computer system 102 can compare the individual parameter scores and/or an aggregate of the scores for each of the candidate items 112A-C to determine a most favorable physical item to pick. For example, relative to the physical items 112A and 112C, the candidate physical item 112B has a most favorable height capacity score because the item 112B has the lowest score value of 1. The most favorable height capacity score can indicate that the item 112B is too small for an amount of space available in the storage location 113A. In other words, the item 112B is not efficiently using the space available in the storage location 113A. By removing the item 112B from the storage location 113A, the available space can be used more efficiently by an item that is sized most similarly to the size of the available space in the storage location 113A. As a comparison, the physical item 112A has the least favorable height capacity score (the highest score value of 4), which can indicate that item 112A is closest in size to the available space in the storage location 115A. In other words, item 112A is optimizing or efficiently using the available space in the storage location 115A. Since storage space is optimized in location 115A with the item 112A, the item 112A may not be a preferred item to pick to fulfill the picking request. Removing or picking the item 112A can make it challenging to fill the available space in the storage location 115A with better fitting items.

As another example, relative to the physical items 112A and 112C, the item 112B has a most favorable weight capacity score because the item 112B has the lowest score value of 1. This score can indicate that, for example, the item 112B does not efficiently use a maximum weight capacity of the storage location 113A. A difference, for example, between a weight of the item 112B and the maximum weight capacity of the location 113A can be too great in comparison to a difference in weight for each of the items 112A and 112C in their respective storage locations. Removing the item 112B from the storage location 113A can therefore open up the storage location 113A to store items that better satisfy weight characteristics of the storage location 113A.

As yet another example, relative to the physical items 112A and 112C, the item 112B has a most favorable fill capacity score because the item 112B has the lowest score value of 2. This score can indicate that the storage location 113A is almost empty and therefore removing the item 112B can free up the storage location 113A to be filled with other items. In some implementations, it can be preferred to empty a storage location so that the location can be filled with similar or same items. Therefore, it may not be preferred to pick or remove an item that is stored in a location that is completely full or filled to a certain threshold value. If an item is removed from a completely full or nearly full storage location, it can be more challenging to fill that empty space with an item that satisfies storage requirements of that storage location. As shown in FIG. 1, the storage location 115A is nearly full, therefore item 112A is assigned a highest score value of 4. Picking or removing the item 112A from the storage location 115A may not result in optimizing storage space and overall facility efficiency.

Once the physical item 112B is selected, the computer system 102 can provide instructions to the mechanical moving system 106 to move the item 112B from the storage location 113A to a destination picking location, such as the docking area 104 (Item C). As depicted, the item 112B can be moved along a route 118, down the aisle 110A. The instructions to move the item 112B can, in some implementations, cause the mechanical moving system 106 to automatically route the item 112B to the docking area 104 without receipt of user input. The mechanical moving system 106 can be automated.

One or more additional items, such as item 124A can also be routed through the warehouse 100. Such items can cause traffic, congestion, queues, or other delays or changes in travel time along routes for each of the items 112A-C. In the example of FIG. 1, no other items are currently moving along the route 118, thereby making the route 118 faster than other routes that can be used to move either item 112A or 112C to the docking area 104. For example, the item 124A can be moving along a route 120, which can be used to move the item 112A from the storage location 115A to the docking area 104. Because of traffic along the route 120, the route 120 can be slower than the route 118 for moving the item 112B to the docking area 104. Therefore, the item 112B can be more favorable than the item 112A since the item 112B has a shorter distance and/or travel time to the docking area 104.

Figure 2B:
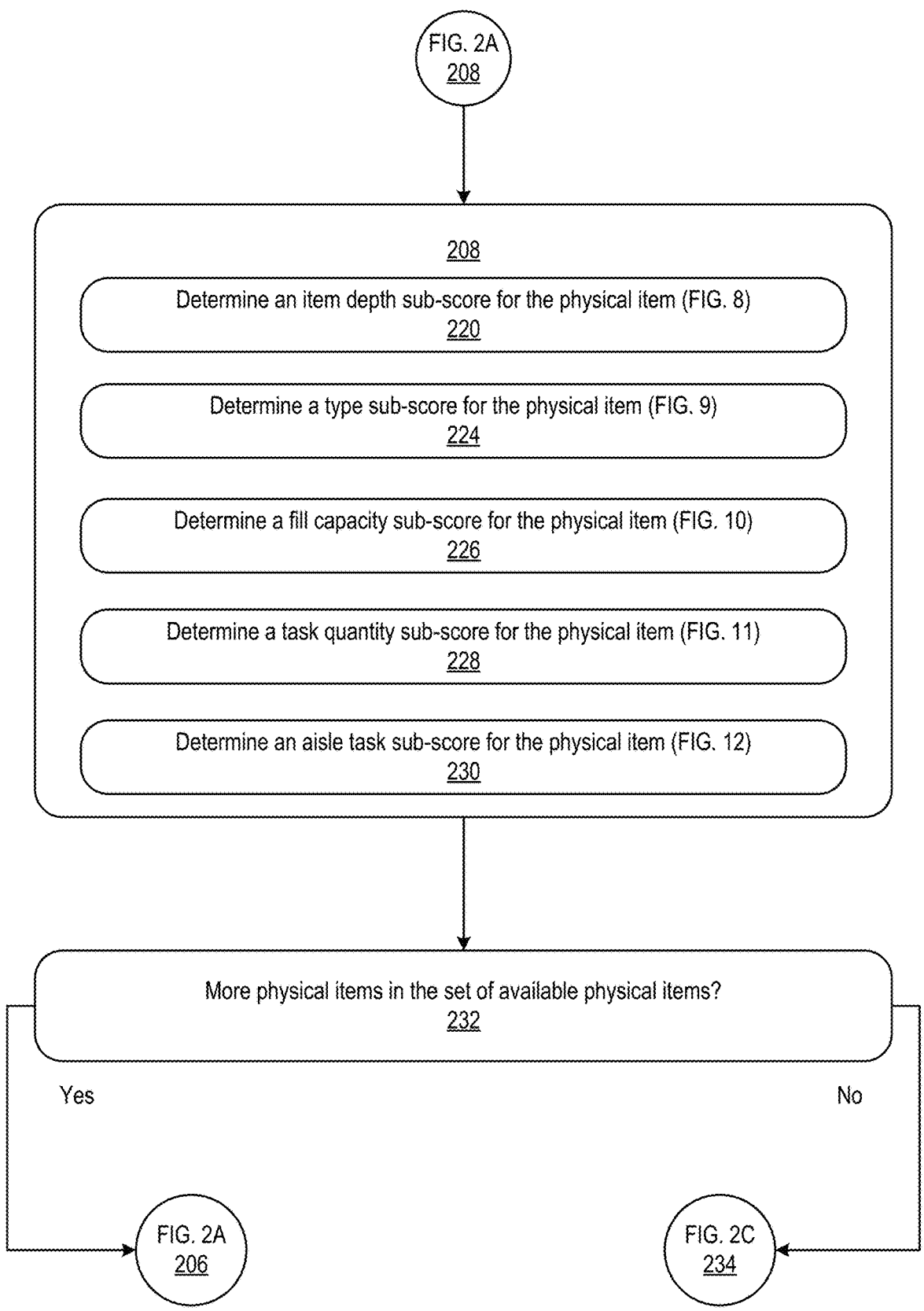
Figure 2C:
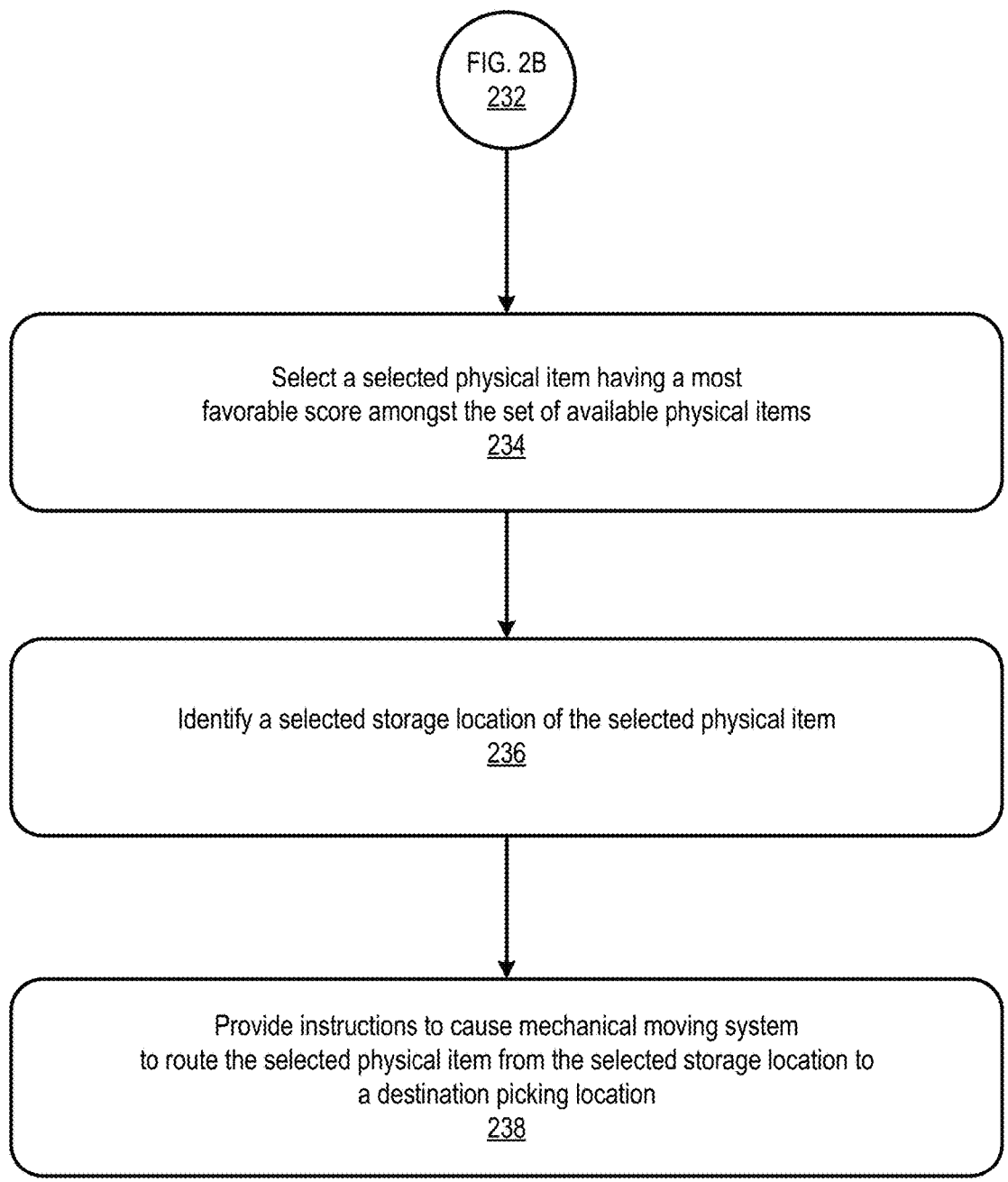

FIGS. 2A-C is a flowchart of a process 200 for selecting the physical item to fulfill the picking request. The process 200 can be performed by one or more computer systems, such as the computer system 102 described herein. The process 200 can be performed once an order or picking request is received at the warehouse, for example by the warehouse management system (WMS). The process 200 can also be performed once a warehouse vehicle is instructed to pick an item for a picking request.

Referring to the process 200 in FIGS. 2A-C, a request to identify a physical item of a particular type to pick in the storage facility can be received (202). One or more inputs or information can be included in the request in 202. These inputs can include but are not limited to a facility code, location name of the item, location coordinates of the item (e.g., x. y, z, or coded region of a warehouse), a picking rate or velocity given to the item during inbound, information about the item (e.g., information that was scanned by a scanner or human worker and inputted into the WMS upon arrival of the item at the warehouse 100), a set of items that may be identical and suitable for substitution, and a set of possible destinations for the item. The information about the item can include owner identifier, item identifier, identifier date, case quantity, case height, gross case height, and/or weight). The set of items that may be identical and suitable for substitution can also include, for each of those items, location name, location coordinates, and location velocity percentile. The set of possible destinations for the item can also include, for each of those destinations, location name and location coordinates.

The request to identify a physical item (202) can also include supporting data or information about storage locations, inventory data, and workers currently assigned to execute tasks in the warehouse 100. The information about the storage locations can include location name, room, aisle, bay level, coordinates, temperature zone, maximum height, maximum weight, maximum capacity, type (e.g., FIFO or LIFO), and set of items currently in the location (which can also be empty). The information about inventory can include, for each inventory, location name, depth in location (e.g., for multi-deep locations), owner identifier, item identifier, and identifier date. Moreover, information about the workers can include worker identifier codes, current task group (e.g., dock, full movement, case pick), task types trained to perform, equipment currently being used, last known location name, last known coordinates, and information about a task currently being performed (e.g., task reference or identifier, information about an item associated with the task, task type, source location name, source location coordinates, target location name, and target location coordinates).

A set of available physical items of the particular type stored in storage locations in the storage facility can be identified (304). As described herein, a picking request can be received by the WMS. The WMS may have a group of items of the particular type already grouped together. The items can be grouped based on characteristics such as customer information, SKU, and product type. The grouping can occur before a picking request is received. In other implementations, the items can be grouped together once the picking request is received. Once the picking request is received by the WMS, the WMS can identify the group of items that can satisfy the picking request and provide that group to the computer system 102. The computer system 102 can then perform the process 200 for each of the items in the group to determine which of the items is most favorable to pick and fulfill the picking request.

The set of physical items can be picked based on one or more characteristics or requirements in the picking request. For example, only items of a same type, associated with a particular customer, and/or of a certain weight can be identified in the set of physical items that can fulfill the picking request. Therefore, not all items stored in the warehouse may be scored to fulfill the picking request—only items that can fulfill the picking request may be identified in the set (204). In some implementations, information about all physical items stored in the warehouse can be received from the WMS and analyzed to determine which physical items meet baseline characteristics to fulfill the picking request.

A physical item form the set of available physical items can be selected in 206. A score for the selected physical item can then be determined based on multiple sub-scores specific to the physical item in 208. The score can be a cost determination based on a current state of the warehouse. In some implementations, and as described herein, a more favorable score can be a lower value score (e.g., closer to 1 or closer to a lower value on a designated favorability scale) and a less favorable score can be a higher value score (e.g., closer to 5 on a 1-5 scale or closer to a higher value on a designated favorability scale). As described in reference to FIGS. 3-13, one or more of the sub-scores comprising the favorability score for each available physical item can include size, weight, maximum weight, travel time, picking velocity, item depth, type, fill capacity, task quantity, and aisle task. The sub-scores can be combined and weighted to determine an aggregate favorability score for each available physical item. One or more sub-scores can be used based on different characteristics of the warehouse or storage facility. For example, some facilities may only weigh or consider some but not all of the sub-scores in determining an aggregate favorability score for each available physical item. Other facilities may weigh or consider all of the sub-scores and additional sub-scores in determining the aggregate favorability score for each available physical location. The sub-scores can also be weighed based on importance within the warehouse. For example, an automated warehouse may place more emphasis on the task quantity sub-score than other sub-scores. Therefore, the task quantity sub-score can be a more important factor in determining an aggregate favorability score per available physical item.

Figure 3:
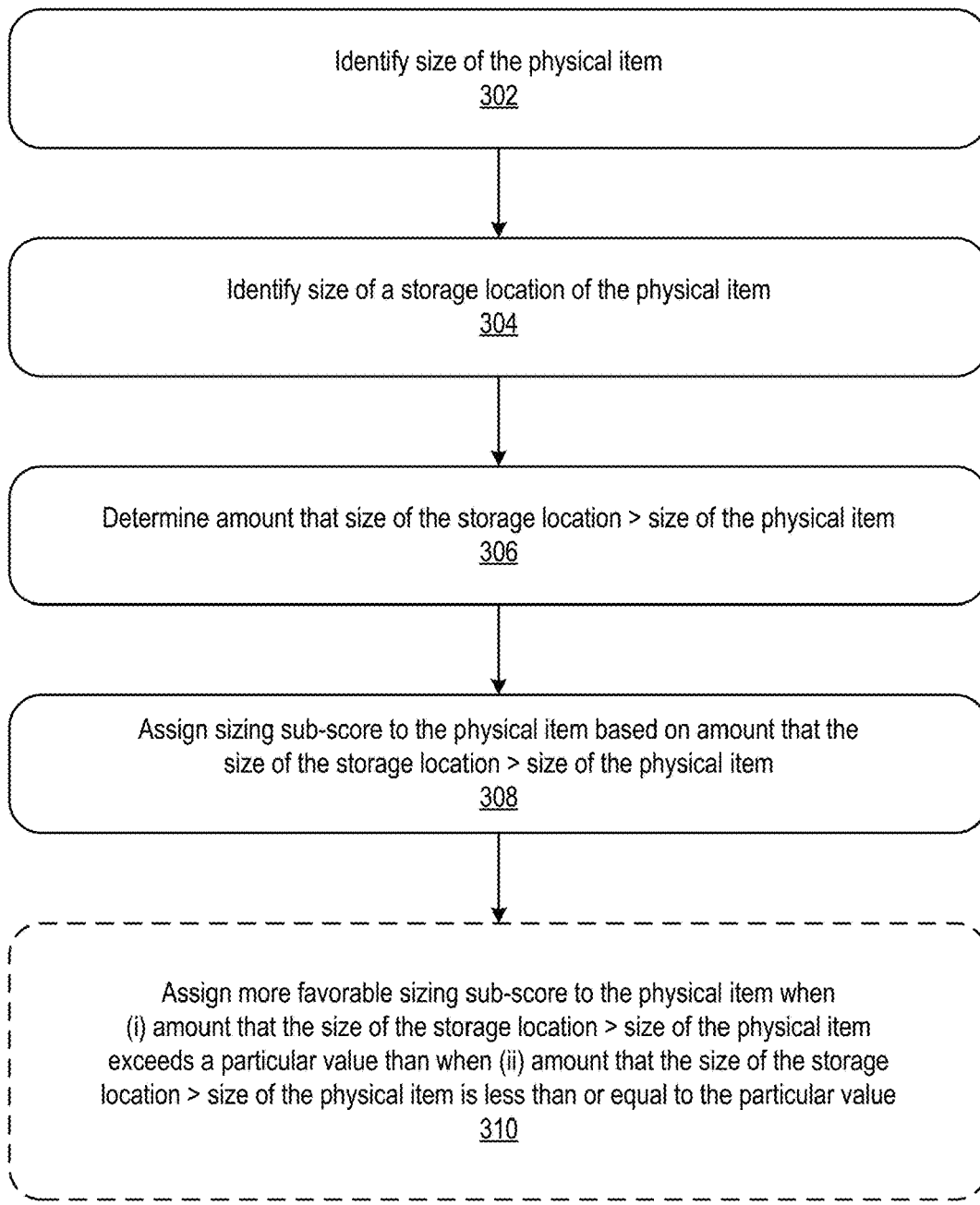
FIG. 3 is a flowchart of a process for determining a sizing sub-score for the physical item.
Figure 12A:
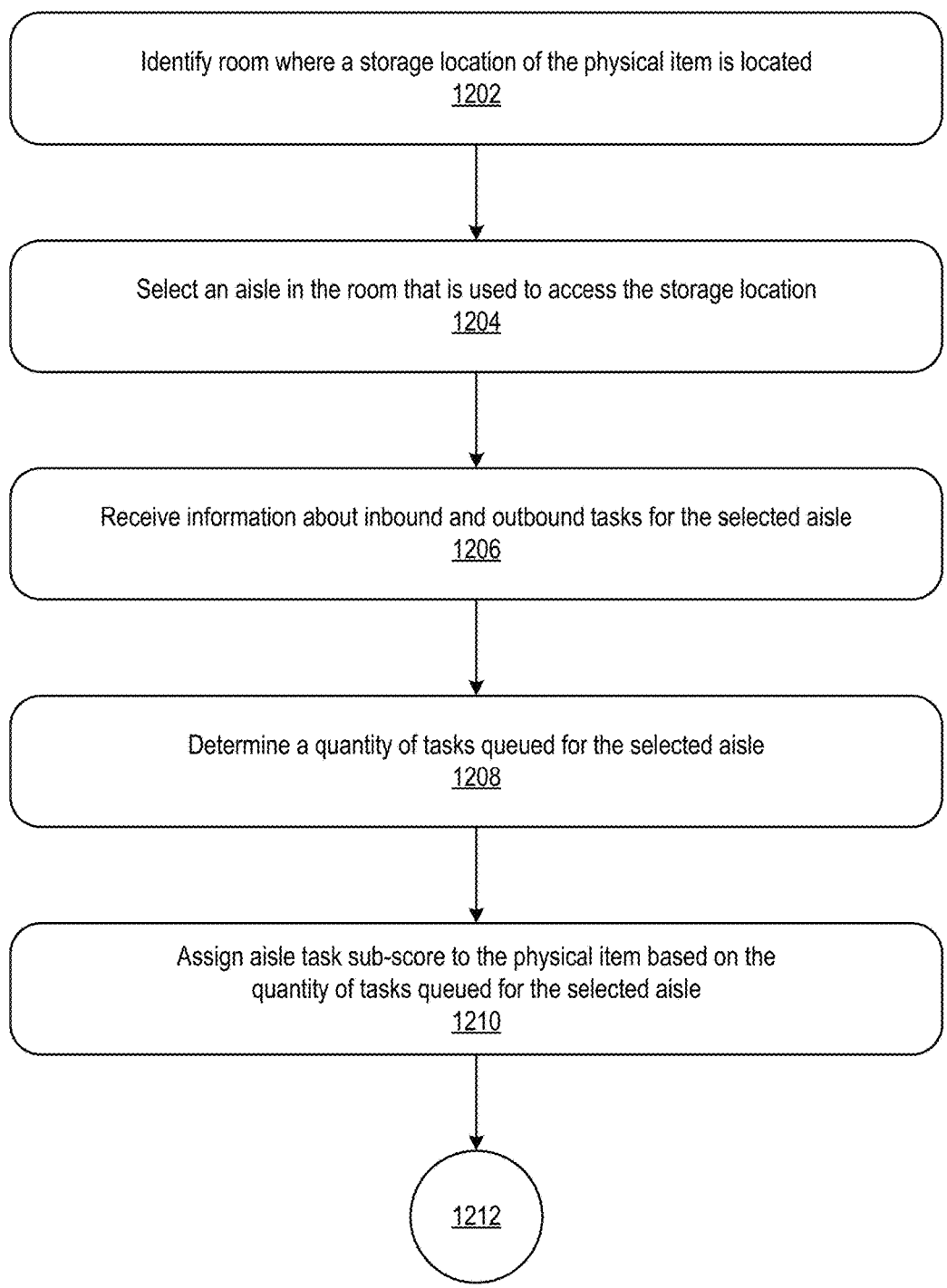
FIGS. 12A-B is a flowchart of a process for determining an aisle task sub-score for the physical item.
Figure 12B:
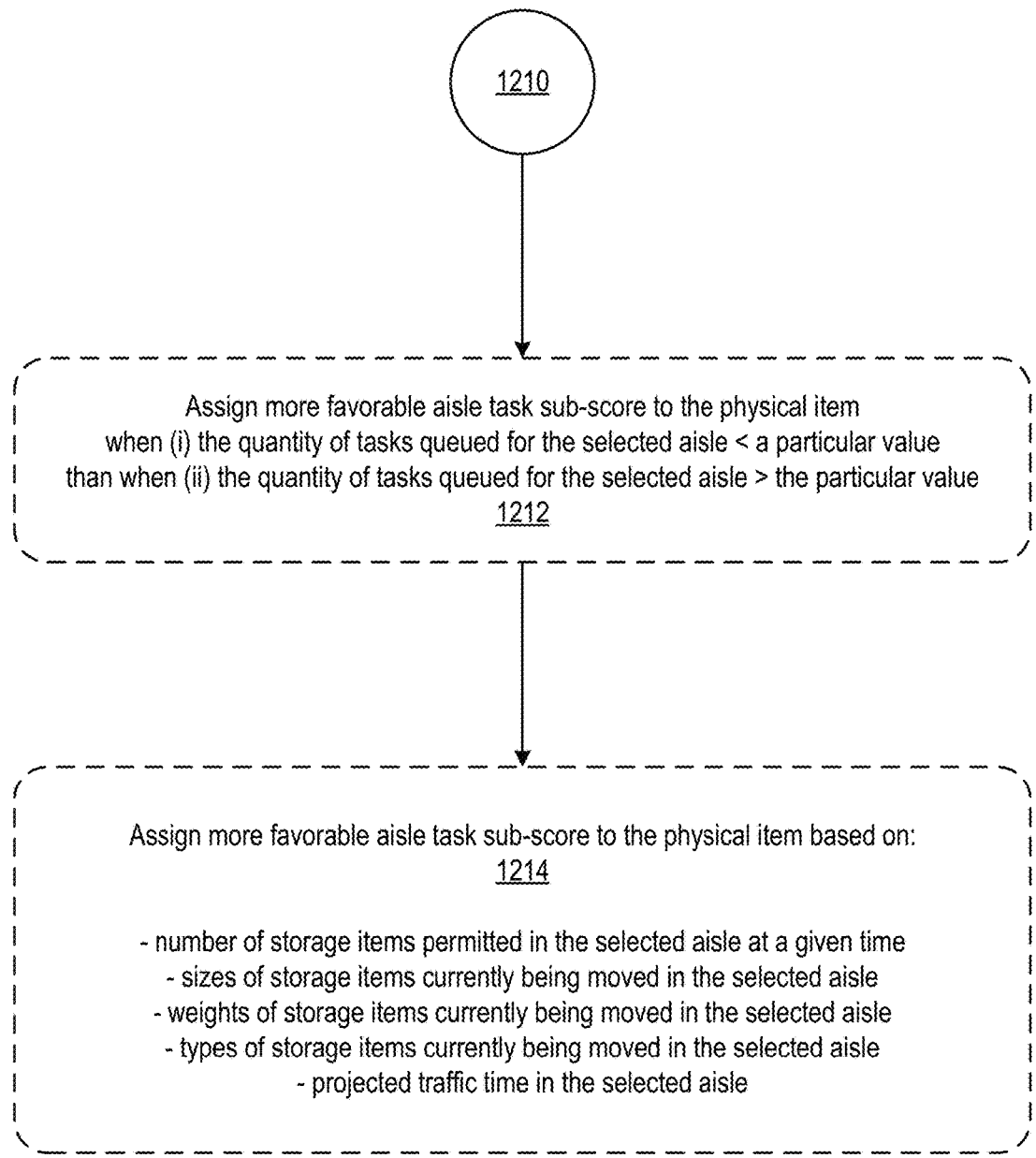
Figure 13B:
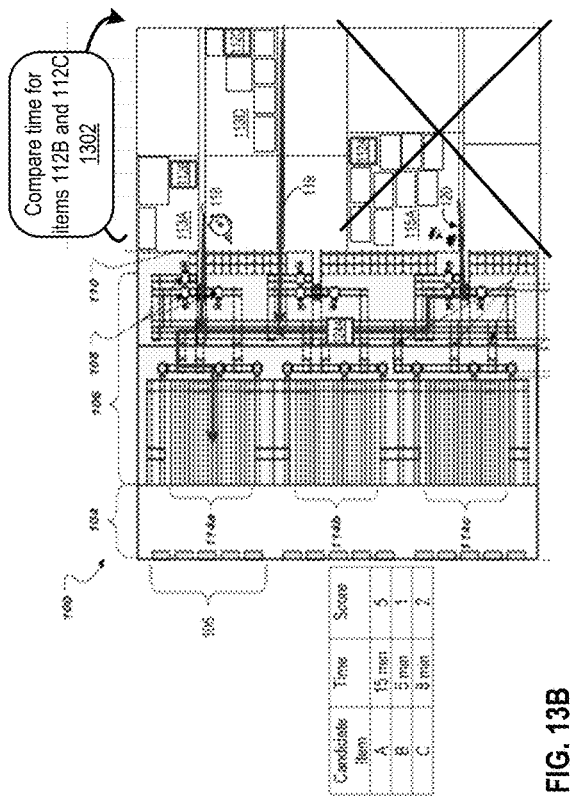
FIG. 13B depicts using the travel time sub-score of FIG. 6 when selecting the physical item for the picking request.
Figure 13D:
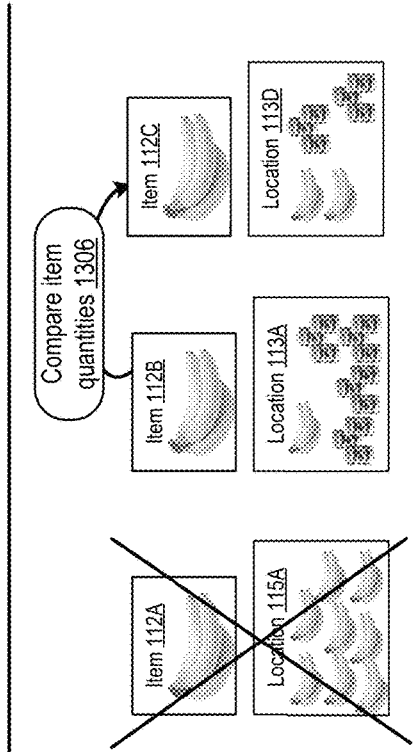
FIG. 13D depicts using the type sub-score of FIG. 9 when selecting the physical item for the picking request.
Figure 13A:
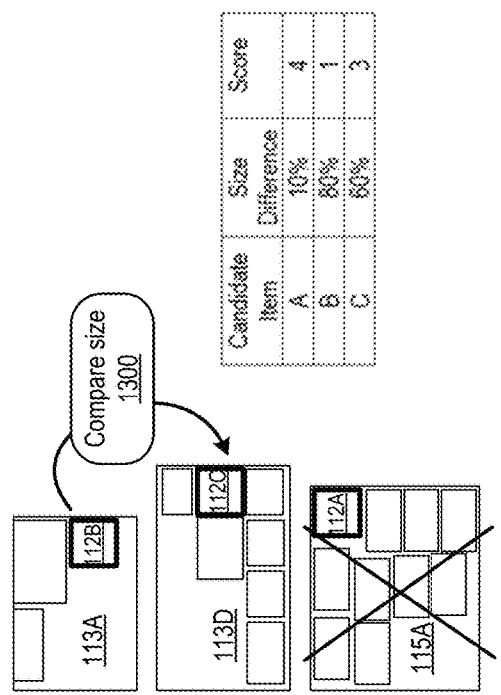
FIG. 13A depicts using the sizing sub-score of FIG. 3 when selecting the physical item for the picking request.

As described in reference to FIG. 3 and FIG. 13A, a sizing sub-score can be determined for the physical item in 210. As described in reference to FIG. 4 and FIG. 13C, a weight sub-score can be determined for the physical item in 212. As described in reference to FIG. 5, a maximum weight sub-score can be determined for the physical item in 214. As described in reference to FIG. 6 and FIG. 13B, a travel time sub-score can be determined for the physical item in 216. As described in reference to FIG. 7, a picking velocity sub-score can be determined for the physical item in 218. As described in reference to FIG. 8 and FIG. 13E, an item depth sub-score can be determined for the physical item in 220. As described in reference to FIG. 9 and FIG. 13D, a type sub-score can be determined for the physical item in 224. As described in reference to FIG. 10 and FIG. 13F, a fill capacity sub-score can be determined for the physical item in 226. As described in reference to FIG. 11 and FIG. 13H, a task quantity sub-score can be determined for the physical item in 228. As described in reference to FIG. 12 and FIG. 13G, an aisle task sub-score can be determined for the physical item in 230.

Once the sub-scores and the aggregate favorability score are determined for the selected available physical item, the computer system 102 can determine whether there are more physical items in the set of available physical items that need to be scored (232). If there are, then the process 200 can return to block 206 and blocks 206-230 can be repeated for each remaining physical item in the set of available physical items.

If there are no more physical items in the set to score, then a selected physical item can be selected for having a most favorable score amongst the set of available physical items in 234. As described herein, the most favorable score can indicate the lowest cost for moving the physical item from its storage location to a destination picking location. The most favorable score can also indicate that removing or picking the selected physical item can optimize on storage space and overall facility efficiency (e.g., removing the selected physical item can open up space in a storage location of the physical item to be used by other items that better match characteristics of the space in the storage location). In some implementations, as described herein, once the physical item is selected, another of the available physical items in the set can be selected as the most favorable for picking based on real-time changes of conditions in the warehouse.

Once the physical item is selected, a selected storage location can be identified for the selected physical item in 236. For example, coordinates, location name, and/or other information about the storage location of the selected physical item can be identified.

Instructions can be provided to cause a mechanical moving system to route the selected physical item from the selected storage location to the destination picking location in 238. In some implementations, instructions can be provided to a warehouse worker (e.g., forklift operator). The warehouse worker can move the physical item from its storage location to the destination picking location. The warehouse worker can also configure components of the mechanical moving system to move the physical item. In other implementations, the physical item can be automatically moved using one or more autonomous vehicles or other components of the mechanical moving system (e.g., conveyor belts, inbound conveyor, a loop, lifts/elevators, aisle carts, and/or cranes). The instructions can include information such as a facility code, location name to retrieve the physical item, location coordinates for the selected storage location (x, y, z), as well as location name of the destination picking location, location coordinates for the selected storage location, and a route to the destination picking location from the selected storage location.

FIG. 3 is a flowchart of a process 300 for determining a sizing sub-score for the physical item. FIG. 13A depicts using the sizing sub-score of FIG. 3 when selecting the physical item for the picking request. The process 300 can be performed by the computer system 102. As mentioned in reference to FIG. 2, the process 300 can be performed for each of the physical items in the set of available physical items that can fulfill the picking request.

Referring to the process 300, a size of the physical item can be identified in 302. A size of a storage location of the physical item can be identified in 304. The size of the storage location can be determined based on subtracting sizes of items currently stored in the storage location from a maximum size of the storage location. An amount that the size of the storage location is greater than the size of the physical item can be determined (306). For example, the size of the physical item can be subtracted from the size of the storage location to determine a size delta. A sizing sub-score can be assigned to the physical item based on the amount that the size of the storage location is greater than the size of the physical item in 308 (e.g., the size delta). In some implementations, the size of the physical item can fall within a range from a minimum size of the storage location to a maximum size of the storage location.

Alternatively or additionally, a more favorable sizing sub-score can be assigned to the physical item when (i) the amount that the size of the storage location is greater than the size of the physical item exceeds a particular value than when (ii) the amount that the size of the storage location is greater than the size of the physical item is less than or equal to the particular value (310). The particular value can be determined by the WMS. The particular value can also be determined based on real-time conditions of the warehouse.

The greater the difference in size between the physical item and the storage location, the less likely that the physical item is a good fit for the storage location, so a more favorable score (e.g., lower numeric value) should be assigned. The more favorable score can indicate that the physical item should be removed or picked from the storage location so that an item that is a better fit for the available size of the storage location can be stored in the storage location. Similarly, if the difference in size is smaller, such as equal to or below the particular value, then a less favorable score (e.g., higher numeric value) can be assigned. The less favorable score can indicate that the physical item has a size that matches the size of storage location and therefore is a better fit for the storage location. Removing the physical item from that storage location can reduce storage optimization since it can make it more difficult to find another item that can fill the space in the storage location once the physical item is removed.

For example, as shown in FIG. 13A, the difference in size between size of candidate item 112A and the available space in storage location 115A is 10%. In some implementations, the size difference can be a numeric value other than a percentage. Here, the 10% size difference can indicate that item 112A fits well into the available space of storage location 115A. Because the discrepancy in size is only 10%, the item 112A is a good fit for the storage location 115A, which means space is being optimized and/or efficiently used. Thus, item 112A can be assigned a high value score of 4 for the sizing sub-score. This high value score indicates that item 112A is the least favorable item to select to fulfill the picking request. Therefore, a size difference can be compared between the items 112B and 112C (item 1300 in FIG. 13A). Item 112B has a size difference of 80% in the storage location 113A while item 112C has a size difference of 60% in the storage location 113D. Item 112B receives the most favorable sizing sub-score of 1 (lowest number value) because item 112B is a worse fit for the available space.

Therefore, in comparing the sizing sub-score (item 1300), the item 112B is can be most desirable to select to complete the picking request.

An available height of the storage location can be compared to a height of the physical item. Additionally or alternatively, dimensions or size of the physical item can be compared with dimensions or size in the storage location. As mentioned, the farther away in size that a space in the storage location is from the physical item's size, the more favorable score can be assigned to that physical item because storing the physical item there is a less efficient use of space. For example, if the physical item is small in size in and the item's storage location has enough space to store larger items, the physical item can be assigned a more favorable sizing sub-score so that the physical item can be removed and the space in the storage location can be optimized.

In some implementations, the sizing sub-score can be weighted more than other sub-scores. This is because it can be desired to optimize space usage in the warehouse. Items that fit well into particular storage locations may not be picked or removed because doing so can reduce space optimization. It can be inefficient to keep a physical item in a location that has a height significantly larger than a height of the physical item.

In some implementations, to optimize on space in the warehouse and based on configuration of the warehouse, a less favorable sizing sub-score can be assigned to a physical item if the item's storage location has enough space to store many small items—in other words, the size delta can be large. This can be advantageous in a warehouse that receives mostly small items rather than large ones. This can also be advantageous when all inbound small items have already been stored in the warehouse or are currently being moved to locations in the warehouse and any remaining inbound items are larger in size. Thus, removing the smaller sized physical item may reduce space efficiency because a large inbound item may not be able to fit into the smaller space that was opened up in the storage location.

Figure 4:
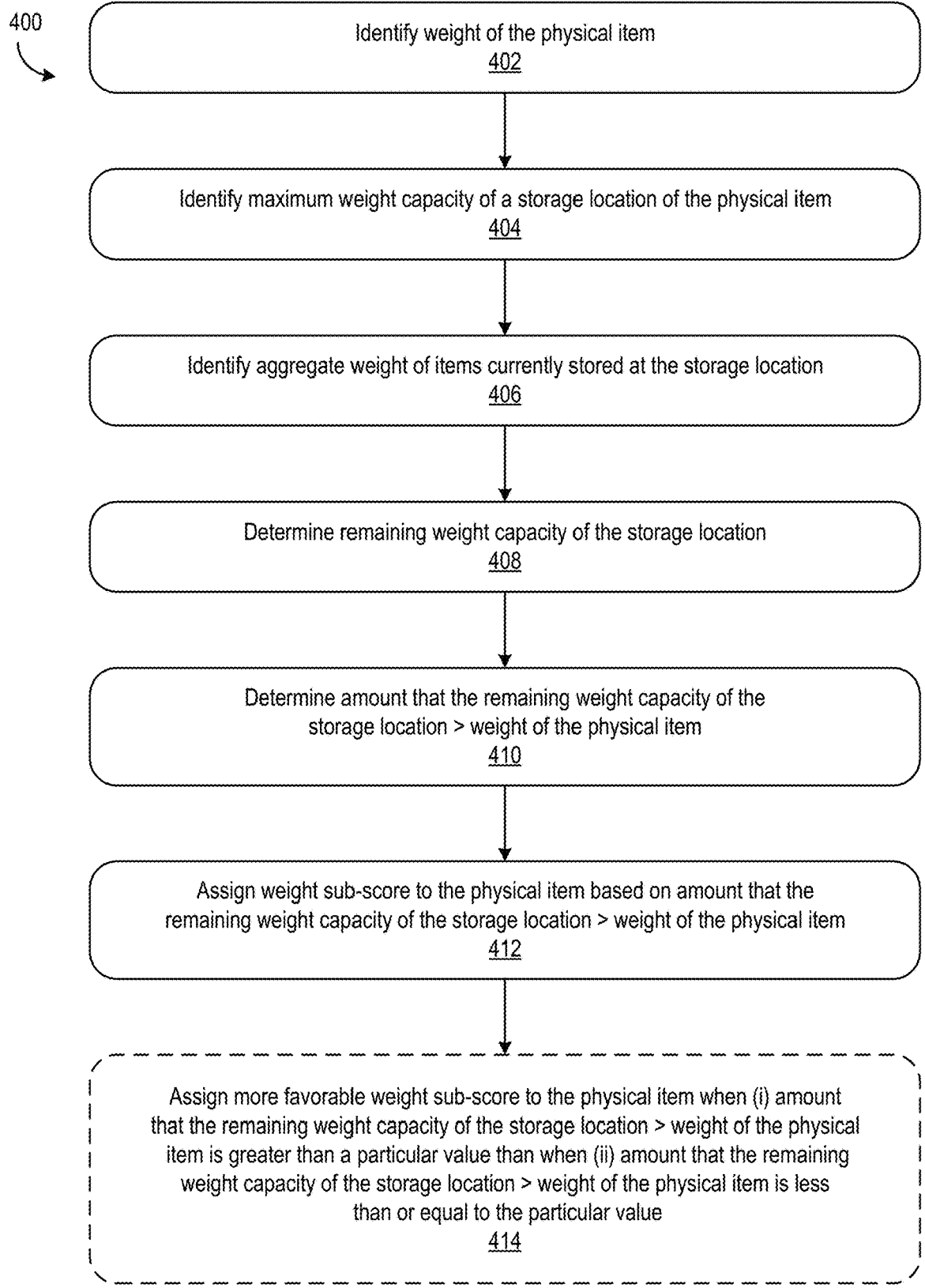
FIG. 4 is a flowchart of a process for determining a weight sub-score for the physical item.
Figure 13C:
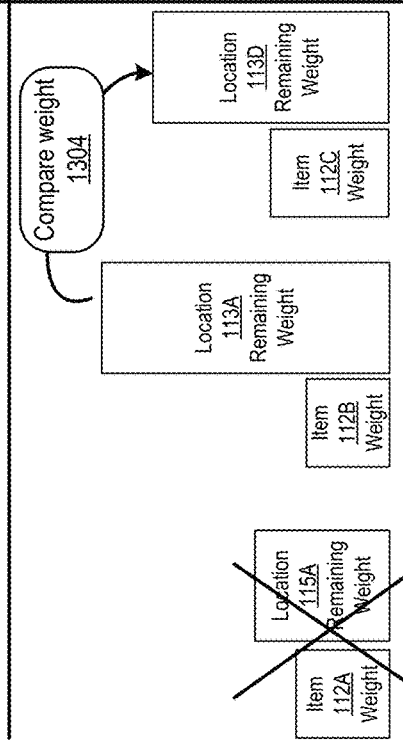
FIG. 13C depicts using the weight sub-score of FIG. 4 when selecting the physical item for the picking request.

FIG. 4 is a flowchart of a process 400 for determining a weight sub-score for the physical item. FIG. 13C depicts using the weight sub-score of FIG. 4 when selecting the physical item for the picking request. The process 400 can be performed by the computer system 102. As mentioned in reference to FIG. 2, the process 400 can be performed for each of the physical items in the set of available physical items that can fulfill the picking request.

Referring to the process 400, a weight of the physical item can be identified in 402. For example, when the physical item entered the storage facility or warehouse, it could have been placed on a mechanical conveying system having weight sensors. The weight sensors could capture weight data and provide that to a WMS. The weight of the physical item can also be inputted by a warehouse worker when the item entered the facility. In other implementations, the weight of the physical item can be provided to the facility before the item arrived at the facility. In other implementations, the weight of the physical item can be identified by placing the item on a scale in the facility before, during, and/or after transport throughout the facility. The weight of the physical item can be stored in a profile associated with the item, in a database/data store and/or the WMS.

A maximum weight capacity of a storage location of the physical item can be identified in 404. Similar to the weight of the physical item, the weight of the storage location can be stored in the WMS and/or a database/data store. The maximum weight of the storage location can be defined before the location is loaded with items for storage.

An aggregate weight of items currently stored at the storage location can be identified in 406. Items that are currently stored in the storage location can be identified. Profiles or information associated with the currently stored items can be retrieved from the WMS and/or database/data store to identify the weights of each item. The weights of each currently stored item can be summed to determine the aggregate weight of the items.

The computer system 102 can then determine a remaining weight capacity of the storage location in 408. For example, the aggregate weight of the currently stored items can be subtracted from the maximum weight capacity of the storage location. The remaining weight capacity can be an amount of weight that can be filled by additional items, such as the physical item. In some implementations, the storage location can have a remaining weight capacity that can be intended to be filled by multiple items, rather than just one item, such as the physical item. In other implementations, the storage location can have a remaining weight capacity that can be filled with only one item, such as the physical item. How the remaining weight capacity can be utilized can be unique to each storage location in the facility and can also take into consideration other factors or parameters, such as a size (e.g., height, width) of items that can be stored in the storage location.

The computer system 102 can determine an amount that the remaining weight capacity of the storage location is greater than the weight of the physical item in 410. For example, a difference or delta between the remaining weight capacity and the weight of the physical item can be identified.

The weight sub-score can be assigned to the physical item based on the amount that the remaining weight capacity of the storage location is greater than the weight of the physical item (412). In other words, and similar to the sizing sub-score depicted and described in reference to FIG. 3, a most favorable weight sub-score can be assigned to the physical item having the greatest delta or difference in weight between the physical item and the remaining weight capacity. A greater difference in weight can indicate that the physical item is not utilizing weight capacity efficiently in the storage location. The physical item can be too lightweight for the storage location. The storage location can have the capability to store heavier items. Therefore, removing the item with the most favorable weight sub-score can be advantageous to free up the weight capacity in the storage location such that the storage location's weight capacity can be better utilized and/or optimized.

Additionally or alternatively, a more favorable weight sub-score can be assigned to the physical item when (i) the amount that the remaining weight capacity of the storage location exceeds the weight of the physical item is greater than a particular value than when (ii) the amount that the remaining weight capacity of the storage location exceeds the weight of the physical item is less than or equal to the particular value (414). The particular value can be assigned based on needs of the storage facility or warehouse. The particular value can also be different per storage room and/or storage location in the facility. In some implementations, the particular value can also dynamically change based on current conditions in the facility. The particular value can be determined by the computer system 102, a WMS, a warehouse worker, and/or any other system or user.

For example, in FIG. 13C, the weight of the items 112A, 112B, and 112C can be compared. As shown, item 112A has a smallest weight difference of 10% with its respective storage location 115A. Therefore, the item 112A can be assigned the least favorable weight sub-score (high value of 4) since, in comparison to items 112B and 112C, item 112A is the best fit with regards to weight for its respective storage location. Removing the item 112A from the location 115A can make it more challenging to fill the remaining weight capacity of the location 115A by 90-100% (thus having a weight difference of 0-10%). Therefore, the item 112A should remain in the location 115A. Moreover, as described in reference to FIG. 13A, the weight difference can be calculated as a numeric value other than a percent value.

The weight differences for items 112B and 112C can be compared in item 1304. Item 112B has a weight difference of 90% with its respective storage location 113A while item 112C has a weight difference of 75% with its respective storage location 113D. Since the difference in weight is larger for item 112B, item 112B can receive the most favorable weight sub-score with the lowest score value of 1. This score can indicate that item 112B can be chosen to fulfill the picking request. Removing item 112B from its respective storage location 113A can open up the remaining weight capacity of the location 113A to be better utilized by items having more similar weight to the remaining weight capacity.

Figure 5:
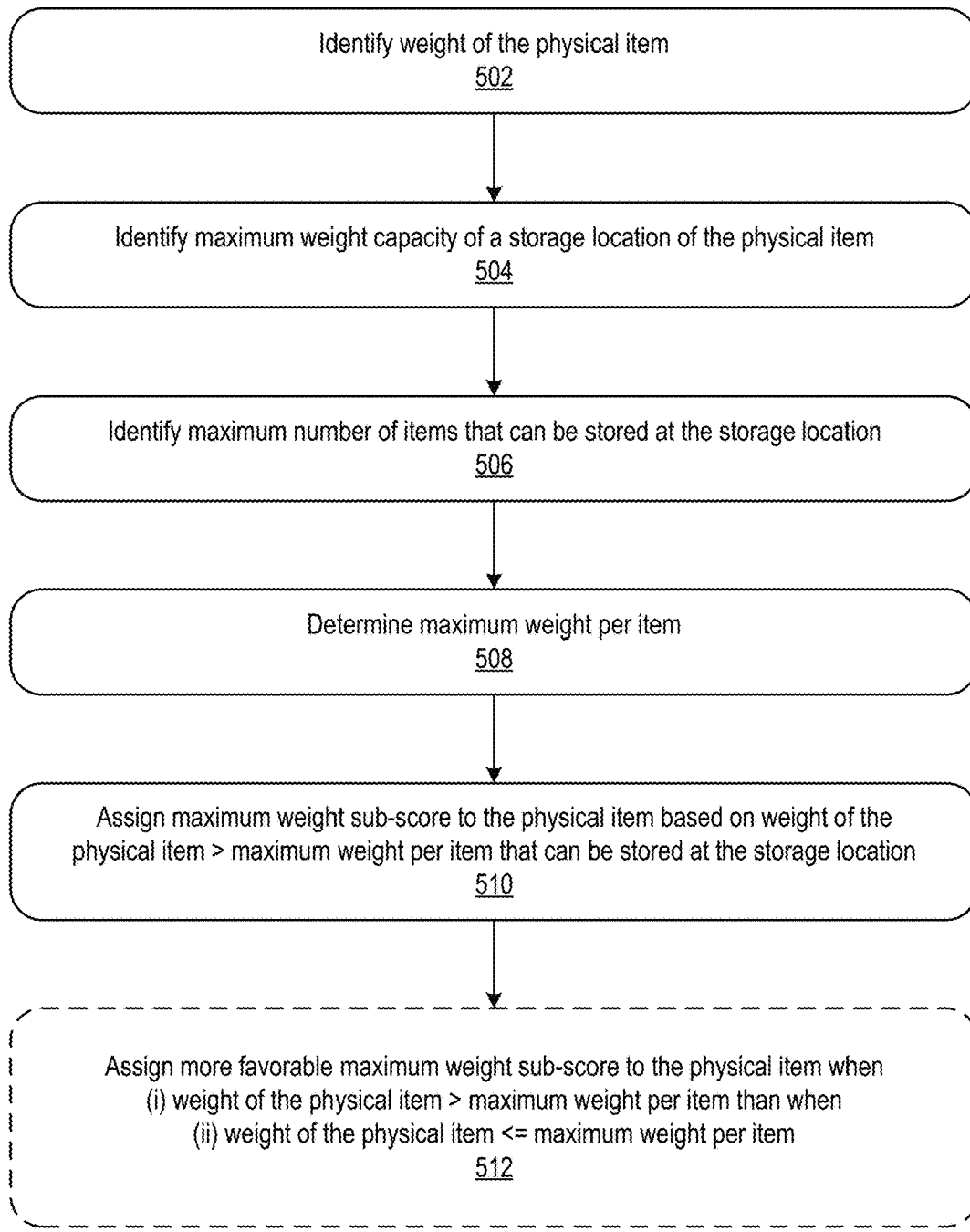
FIG. 5 is a flowchart of a process for determining a maximum weight sub-score for the physical item.

FIG. 5 is a flowchart of a process 500 for determining a maximum weight sub-score for the physical item. The process 500 can be performed by the computer system 102. As mentioned in reference to FIG. 2, the process 500 can be performed for each of the physical items in the set of available physical items that can fulfill the picking request.

Referring to the process 500, a weight of the physical item can be identified in 502. The physical item's weight can be identified similarly as in block 402 of the process 400 (e.g., refer to FIG. 4). A maximum weight capacity of a storage location of the physical item can be identified by the computer system 102 in 504. The maximum weight capacity of the storage location can also be identified similarly as in block 404 of the process 400.

A maximum number of items that can be stored at the storage location can be identified in 506. For example, the WMS can store information about how many items the storage location can have at a given time. The maximum number of items can also dynamically change based on conditions in the facility and/or the storage location. For example, the storage location can initially be configured to store fewer larger items. However, based on increased, real-time traffic conditions, the storage location can become a temporary storage location in which items can be routed there for short, temporary periods of time. In such a situation, the storage location can store more items than it typically and/or initially can store. Updates to a quantity of items that can be stored in the storage location can be accessible via the WMS and/or a profile associated with the storage location that is stored in a database/data store.

In some implementations, the computer system, may additionally or alternatively determine a quantity of items currently stored at the storage location in 506. Sensors positioned in the storage location and/or outside the storage location can capture images of the items going into and/or remaining in the storage location. Using such images, the computer system 102 can determine a quantity of items stored therein. The computer system 102 can also access the WMS and/or the database to count how many items are associated with the storage location.

The computer system 102 can determine a maximum weight per item in 508. For example, the maximum weight capacity of the storage location can be divided by the maximum number of items that can be stored at the storage location. The resulting value can indicate a maximum amount of weight that each item can be for the storage location. In some implementations, the maximum weight per item can depend on types of items stored at the storage location. For example, the maximum weight capacity of the storage location can be divided based on groupings or item types. As an illustrative example, a storage location can have 1,000 lb as a total maximum weight capacity. A first group of items can fill 500 lb of the 1,000 lb of total weight. A second group of items can fill or be assigned 250 lb of the remaining 500 lb of the 1,000 lb total weight of the storage location. A third group of items can also be assigned 250 lb of the remaining weight of the 1,000 lb total weight. The maximum weight per item can be different per grouping of weight, especially since each of the groups can have different quantities of items.

The computer system 102 can assign a maximum weight sub-score to the physical item based on the weight of the physical item exceeding the maximum weight per item that can be stored at the storage location in 510. As described in reference to the weight sub-score described in the process 400 in FIG. 4, if the weight of the physical item exceeds the maximum weight capacity per item by a predetermined threshold value, the physical item can be assigned a more favorable maximum weight sub-score. In some implementations, the greater the difference or delta between the weight of the physical item and the maximum weight capacity per item, the more favorable score can be assigned to the physical item.

Additionally or alternatively, the computer system 102 can assign a more favorable maximum weight sub-score to the physical item when (i) the weight of the physical item exceeds the maximum weight per item than then (ii) the weight of the physical item is less than or equal to the maximum weight per item. When the weight of the physical item is greater than the total average weight for the storage location, then the weight capacity of the storage location may not be optimized. The inefficient use of weight can limit a type of goods that can be stored at the storage location. Hence, removing the physical item having the greatest difference or delta in weight can be advantageous to optimize on usage of weight capacity in the storage location. In some implementations, for example, it can be desirable to store only light items in a storage location but the physical item is too heavy to make storage of lighter items feasible. That physical item can be assigned a more favorable maximum weight sub-score such that the physical item can be picked to fulfill the picking request. Once the physical item is removed from the storage location, the storage location can be filled with many lightweight items.

In some implementations, the more that the weight of the physical item exceeds the maximum weight capacity per item, the more the maximum weight sub-score can be weighted for that physical item relative to other physical items. Moreover, if the weight of the physical item is less than the maximum weight capacity per item for the respective storage location, additional items can still be stored in the storage location to fill the weight capacity of that location. Therefore, a physical item that does not exceed the maximum weight capacity per item can receive a least favorable score (highest numeric value score) relative to other physical items that may equal the maximum weight capacity per item and/or exceed the maximum weight capacity per item. In some implementations, the most favorable score can be assigned to a physical item whose weight capacity is less than the maximum weight capacity per item by a predetermined threshold value. In other words, if the item is significantly less than the maximum weight capacity per item for that storage location, then the item is not optimizing on the available weight capacity for that location. Removing the item can free up the little weight that the item was taking up so that storage location can store items having a greater weight.

Figure 6:
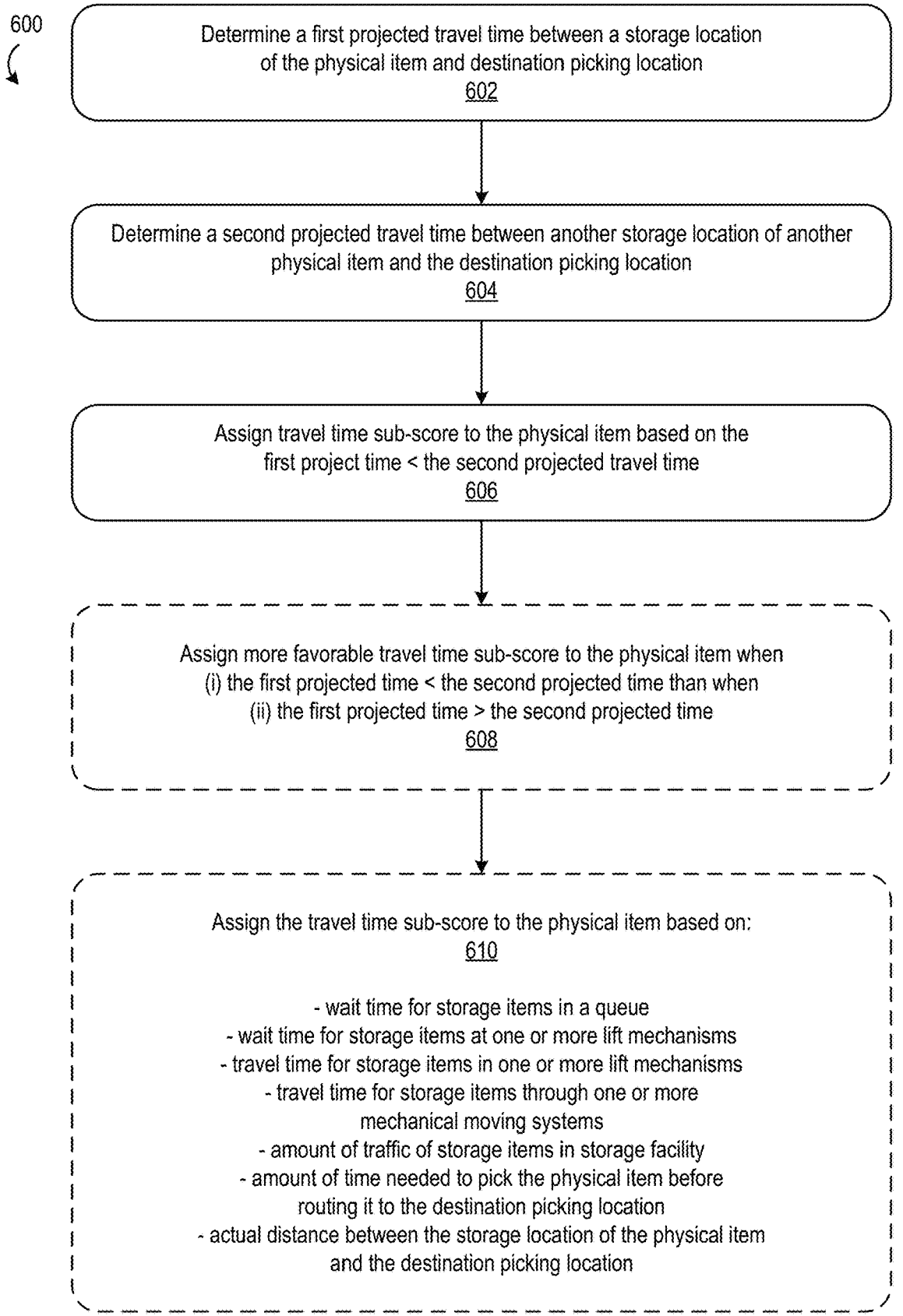
FIG. 6 is a flowchart of a process for determining a travel time sub-score for the physical item.

FIG. 6 is a flowchart of a process 600 for determining a travel time sub-score for the physical item. FIG. 13B depicts using the travel time sub-score of FIG. 6 when selecting the physical item for the picking request. The process 600 can be performed by the computer system 102. As mentioned in reference to FIG. 2, the process 600 can be performed for each of the physical items in the set of available physical items that can fulfill the picking request.

Referring to the process 600, the computer system 102 can determine a first projected travel time between a storage location of the physical item and a destination picking location (602). The computer system 102 can also determine a second projected travel time between another storage location of another physical item and the destination picking location in 604. The projected travel time scores can also take into consideration an amount of time needed to move the physical item, once at the destination picking location, from the destination picking location and into a truck, trailer, or other outbound vehicle or vessel.

The travel time sub-score can be assigned to the physical item based on the first projected time being less than the second projected travel time in 606. The physical item having the first projected time can be assigned a more favorable travel time sub-score than the other physical item having the second projected time because it can be faster to move the physical item to the destination picking location. The faster it is to move the item through the facility, the less likely that this movement can cause traffic or congestion in the facility. This can improve efficiency within the facility. Travel times can be projected for each of the physical items in the set of available physical items that can fulfill the picking request. The travel times can then be compared to determine which physical item of the set of available physical items has the shortest travel time.

Additionally or alternatively, a more favorable travel time sub-score can be assigned to the physical item when (i) the first projected time is less than the second projected time than when (ii) the first projected time is greater than the second projected time (608).

Moreover, additionally or alternatively, the travel time sub-score can be assigned based on one or more factors in 610. The factors can include but are not limited to wait time for storage items in a queue, wait time for storage items at one or more lift mechanisms, travel time for storage items in one or more lift mechanisms, travel time for storage items through one or more mechanical moving systems, an amount of traffic of storage items in the storage facility, an amount of time needed to pick the physical item before routing it to the destination picking location, and an actual distance between the first storage location of the physical item and the destination picking location.

The travel time sub-score can be based on an amount of time needed to move the physical item from its respective storage location to the destination picking location (e.g., dock area, staging lane, etc.). The travel time sub-score can be based additionally or alternatively on an actual distance (e.g., using GPS coordinates) between the current location of the physical item and the destination picking location. For example, the actual distance can be a rough estimate and can be used as a weighting factor for determining a more favorable or less favorable travel time sub-score. In some implementations, a physical item having the shortest distance from its respective storage location to the destination picking location can be assigned the most favorable travel time sub-score and selected to fulfill the picking request.

GPS and/or location sensors throughout the warehouse, on the physical item, and/or on a forklift or other vehicle that is moving the physical item can be used to identify one or more coordinates of the item relative to one or more locations in the warehouse. Triangulation techniques can then be used to determine the actual distance between the physical item and the destination picking location.

In other implementations, the actual distance may not be used in determining the travel time sub-score. For example, a physical item that is farther away in distance from the destination picking location can be assigned a more favorable score than closer physical items because of one or more factors: (1) less traffic can currently exist or be projected along a route to the farther away physical item, (2) the route to the farther away physical item can be less frequented, (3) the farther away physical item can be faster to pick since fewer items are stored with the physical item (which can also indicate that the storage location of the physical item may have less traffic in the future (e.g., at a time that the physical item may have to be picked from the location), (4) getting to the farther away physical item may not require wait times at elevators, lift mechanisms, or cranes, (5) wait times to get to the farther away physical item can be less than wait times to get to other closer physical items, and/or (6) a combined projected time to get to the farther away physical item can be less than a combined projected time for getting to a closer location.

One or more different units can be combined to determine an overall travel time for the physical item. For example, current and/or projected wait times, travel times through conveyor systems and/or lifts, and/or travel time through one or more different aisles can be combined to determine the overall travel time. The overall travel time can also change dynamically and/or in real-time based on conditions in the facility and/or movement (inbound and outbound) of other items to storage locations and other locations in the facility.

In some implementations, a physical item can be assigned a favorable score when that physical item has a historically faster picking rate and/or travel time in comparison to other available physical items. For example, a physical item closer to a warehouse loading dock can be assigned a favorable score since that physical item can have a faster picking rate than other locations in the facility. This can be advantageous where the physical item requires faster picking and/or less travel time upon picking/outbound movement from the warehouse.

For example, as shown in FIG. 13B, moving the item 112A from the storage location 115A along the route 120 can be slower (15 minutes) than moving item 112B from storage location 113A along the route 118 (5 minutes) and moving item 112C from storage location 113D along the route 119 (8 minutes). Item 112A can be assigned a least favorable score (numeric value of 5). Times for items 112B and 112C can be compared in item 1302. Since the item 112B has the shortest projected time (e.g., the first projected time described in reference to the process 600 in FIG. 6), item 112B can be assigned a most favorable travel time sub-score (numeric value of 1).

Still referring to FIG. 13B, item 112A can have the slowest travel time for one or more reasons. For example, the item 112A itself can require more time to be picked since it is stored behind many other items in the location 115A (as depicted, 3 items are stored in front of the item 112A). Moreover, the item 112A can be the farthest away from the dock area 104. Additional items, such as item 124A can be moving along the route 120, thereby causing traffic or an increased amount of time needed to move the item 112A from the storage location 115A to the destination picking location (dock area 104). Item 112C can have a slightly shorter travel time than item 112A because item 112C's storage location 113D can be closer to the destination picking location than item 112A's storage location 115A. Moreover, fewer items can be stored in front of the item 112C, thereby making it slightly easier to pick item 112C than it is to pick item 112A (as depicted, 1 item is stored in front of the item 112C). Finally, the item 112B can have the fastest travel time for one or more reasons. For example, the item 112B's location 113A can be closest to the destination picking location. The item 112B can be the fastest to pick since no other items are currently stored in front of the item 112B. Moreover, there may be no traffic, congestion, or other items projected to be traveling along the route 118. Therefore, the item 112B can be assigned a most favorable travel time sub-score.

Figure 7A:
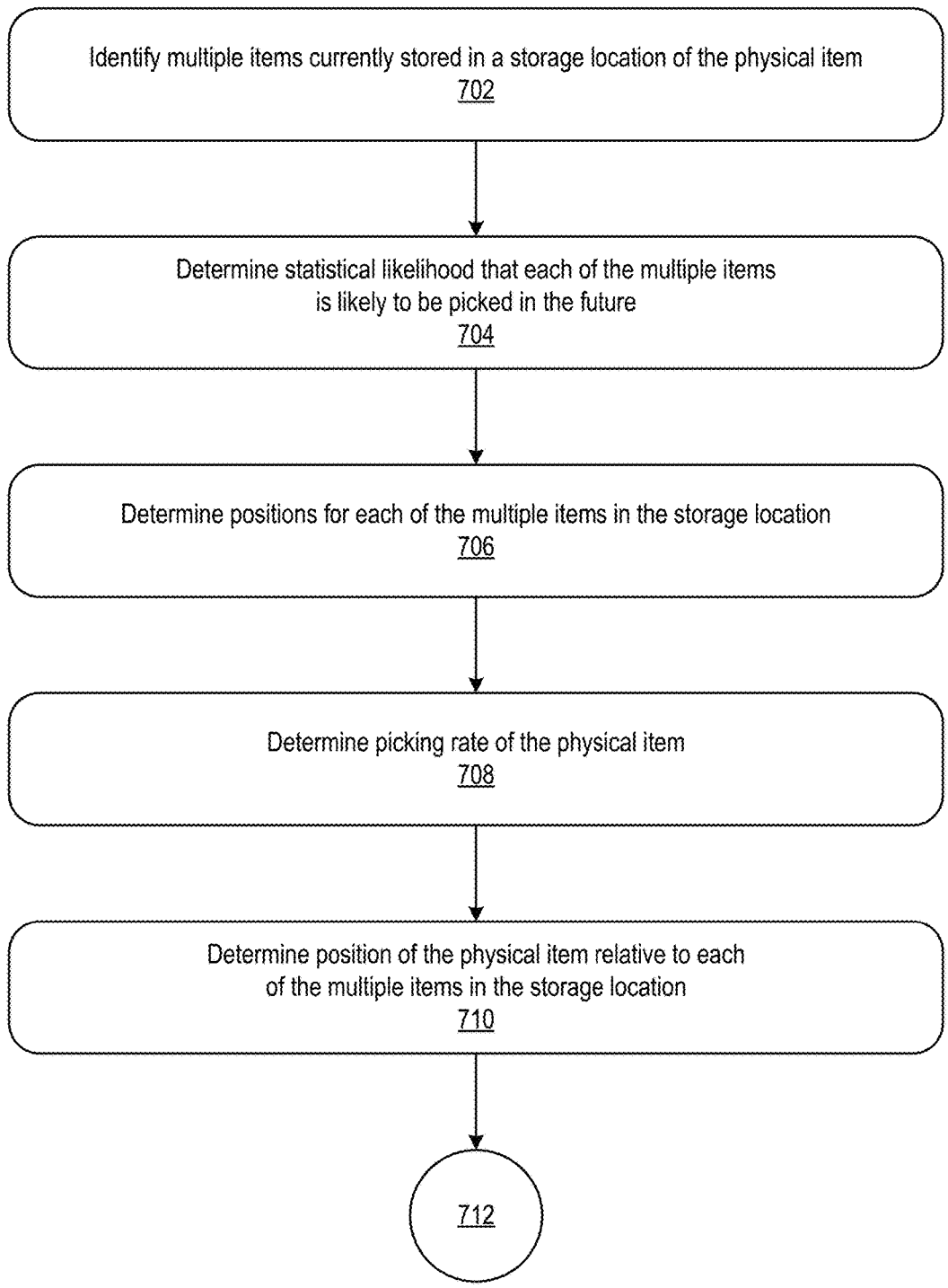
FIGS. 7A-B is a flowchart of a process for determining a picking velocity sub-score for the physical item.
Figure 7B:
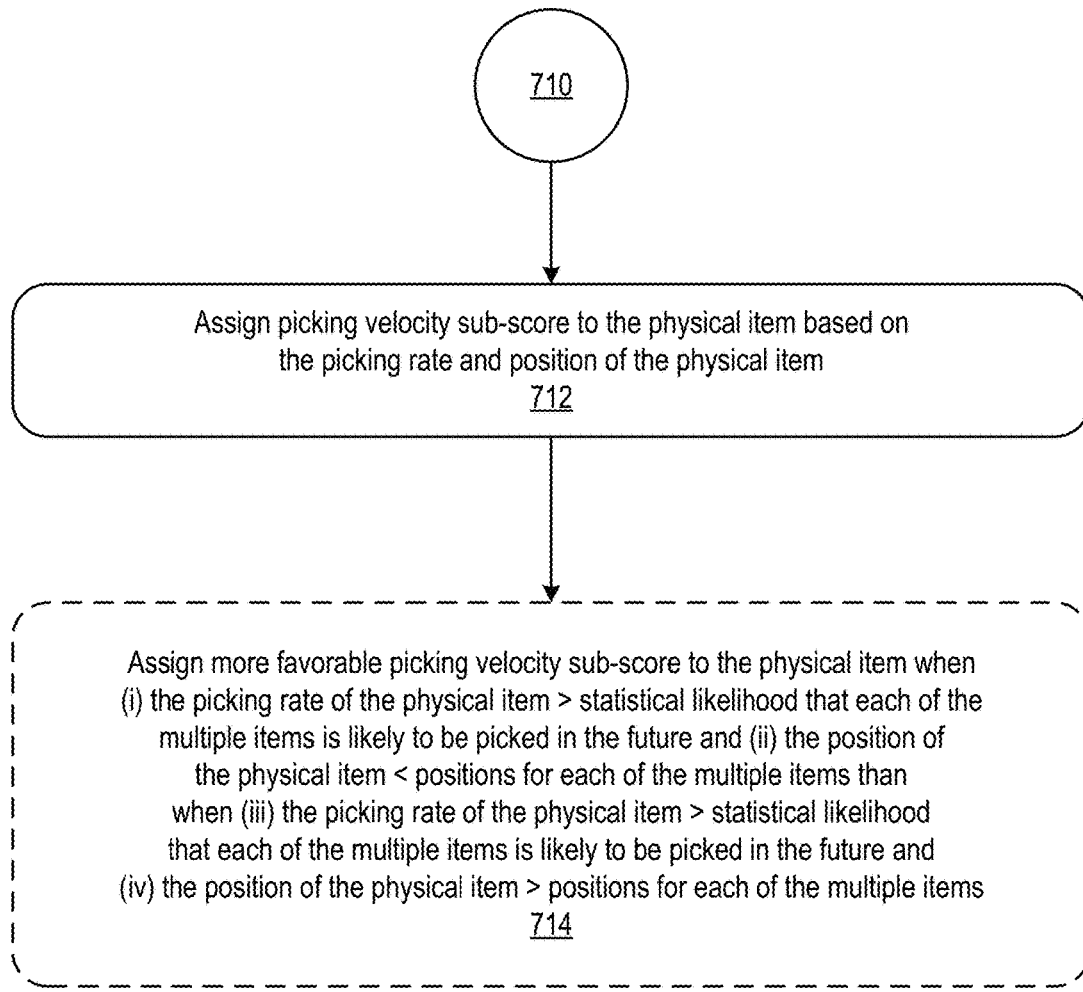

FIGS. 7A-B is a flowchart of a process 700 for determining a picking velocity sub-score for the physical item. The process 700 can be performed by the computer system 102. As mentioned in reference to FIG. 2, the process 700 can be performed for each of the physical items in the set of available physical items that can fulfill the picking request.

Referring to the process 700 in both FIGS. 7A-B, the computer system 102 can identify multiple items currently stored in a storage location of the physical item in 702. For example, the computer system 102 can retrieve this information from the WMS and/or a database/data store.

The computer system 102 can then determine a statistical likelihood that each of the multiple items is likely to be picked in the future in 704. This determination can be based on historical information about each of the multiple items compared to historical information about the physical item. If one or more of the multiple items have been more frequently picked or picked faster than the physical item, then there can be a greater likelihood that the one or more of the multiple items will be picked before the physical item. The determination of the statistical likelihood can also be based on real-time conditions in the facility, including for example, information about when the multiple items may be picked or considered for a picking request in the near future or some predetermined timeframe. In some implementations, the statistical likelihood can be based on positions for each of the multiple items. For example, the storage location can have designated picking rates for each position in that storage location. All items stored in a first position can have the same fastest picking rate while all items stored in a last position in the location can have the same slowest picking rate. In some implementations, statistical likelihood of movement for each of the multiple items can be based on picking rates associated with each of the multiple items rather than positions in the storage location.

The computer system 102 can then determine positions for each of the multiple items in the storage location in 706. For example, the positions of the items can be stored in the WMS and/or the database. The positions can be associated with profiles for each of the multiple items. As another example, cameras or other sensors can be configured in the storage location and directed towards the items. The cameras or other sensors can capture imaging data which can be used by the computer system 102, using image processing techniques, to determine positions for each of the multiple items. Positions can be associated with depth of racks in the storage location. For example, some storage locations can be five items (e.g., pallets) deep. Moreover, some storage locations can have stacked items, and a position can be associated with a depth and height of each of the multiple items. Each storage location in the facility can have a different depth and/or number of positions. In an illustrative example where a storage location has 5 positions, position 1 can be closest to an aisle where items can be moved around and position 5 can be farthest away from the aisle. In other words, position 1 can be in front of all the other positions and position 5 can be the last position in the storage location.

A picking rate can be determined for the physical item in 708. In some implementations, the block 708 can be performed before or after any of the other previously described blocks 702-706. The picking rate can be based on historical picking rates associated with the physical item and/or the storage location of the physical item. The picking rate can be based on how fast the physical item is pulled or selected for picking requests and/or how much the physical item is in stock. The picking rate can also be based on anticipated picking requests as well as prior picking requests. The picking rate can be an amount of time that the physical item remains in storage at the storage location until it is selected to fulfill a picking request. The picking rate can also be based on an amount of time that it takes to actually move the physical item from its position in the storage location once it is selected for the picking request. This picking rate can also include an amount of time needed to rearrange one or more other items currently stored at the storage location in order to reach the physical item.

A position of the physical item relative to each of the multiple items in the storage location can be determined (710). For example, block 710 can include determining whether the physical item is in front of other of the multiple items. Block 710 can also include determining how many of the other multiple items the physical item is in front of or behind.

The picking velocity sub-score can be assigned to the physical item based on the picking rate and the position of the physical item in 712.

Additionally or alternatively, a more favorable picking velocity sub-score can be assigned to the physical item when (i) the picking rate of the physical item exceeds the statistical likelihood that each of the multiple items is less likely to be picked in the future and (ii) the position of the physical item is less than positions of each of the multiple items than when (iii) the picking rate of the physical item exceeds the statistical likelihood that each of the multiple items is less likely to be picked in the future and (iv) the position of the physical item is greater than the positions for each of the multiple items (714). The picking velocity sub-score can also be determined based on whether keeping the physical item in its current position in the storage location may violate a first-in-first-out order (FIFO) and/or a first-in-last-our order (FILO). If the physical item is projected to be picked sooner than items currently stored in the location, then the item can be assigned a more favorable score than another physical item that can be picked at a same time or at a later time than the items currently stored there.

As an example, if the physical item has a lower average picking rate than other items in positions behind the physical item and the physical item is in the first or second position (closest to a front of all the positions in the storage location), then the physical item can be assigned a more favorable score than other physical items that may have higher average picking rates and be stored in the same position. Removing the physical item can be advantageous to prevent traffic in the future when the items in positions behind the physical item may need to be picked sooner than the physical item. Therefore, items in front positions that have long turnaround times can be blocking items having shorter turnaround times and should be removed from the storage location.

Alternatively, in some implementations, a more favorable score can be assigned to items that are in back positions rather than front positions. Assigning the more favorable sub-score to a physical item in a farther back position can be desirable or preferred if the storage location has current capacity to move around currently stored items. It can be more efficient, therefore, to remove the physical item at the current time while there is open space in the storage location than when there is no available capacity in the storage location at a later time. Trying to move the physical item at the later time when there is no available capacity can cause traffic and/or congestion in an aisle leading to the storage location, especially if the physical item has to be removed from its position before items in positions in front of the physical item are removed.

In some implementations, a larger delta between an expected picking rate of the physical item and expected picking rate of other items in other relative positions in the storage location can indicate that the physical item can receive a more favorable picking velocity sub-score. A delta can be determined between the position of the physical item and a total number of positions in the storage location. A more favorable picking velocity sub-score can be assigned to the physical item when the delta is larger than a threshold value than when the delta is less than or equal to the threshold value. An advantage of this implementation is to identify whether the physical item is stored in the right position based on each position's desired picking rate. The desired picking rates per position can be determined by the WMS and/or stored in the WMS or a database/data store. The greater the delta, the more likely the physical item should be moved to a different position that is intended to have a similar picking rate as the physical item.

In some implementations, an aggregate statistical likelihood that all of the multiple items in the storage location will be moved can be determined. Then, the computer system 102 can determine whether, based on the aggregate statistical likelihood, the physical item is in a storage location that is preferred for the physical item's picking rate. For example, it can be desirable to store in one location items having the same or similar picking rate. Therefore, if the physical item has a picking rate that is equal to or within a particular threshold of the aggregate picking rate for the storage location, then the physical item can receive a less favorable score. In other words, keeping the physical item in the storage location can be more advantageous to ensure facility storage optimization.

In some implementations, a picking rate can be determined based on how much of an item is put on a truck or sent for outbound shipment on a daily, weekly, or other predetermined basis. An average picking rate score can be determined over a certain amount of time. The picking rate can also be normalized. In some implementations, if the physical item is in a storage location that is close to a destination picking location, the picking velocity sub-score can be more favorable since picking and moving the physical item from this location can be faster than picking and moving another physical item from a storage location that is farther away from the destination picking location. In other implementations, a less favorable picking velocity sub-score can be assigned to a closer physical item if there are real-time bottlenecks or traffic associated with moving the physical item from its current position and storage location to the destination picking location. This can be advantageous to increase overall warehouse efficiency and to minimize potential latencies.

Figure 8:
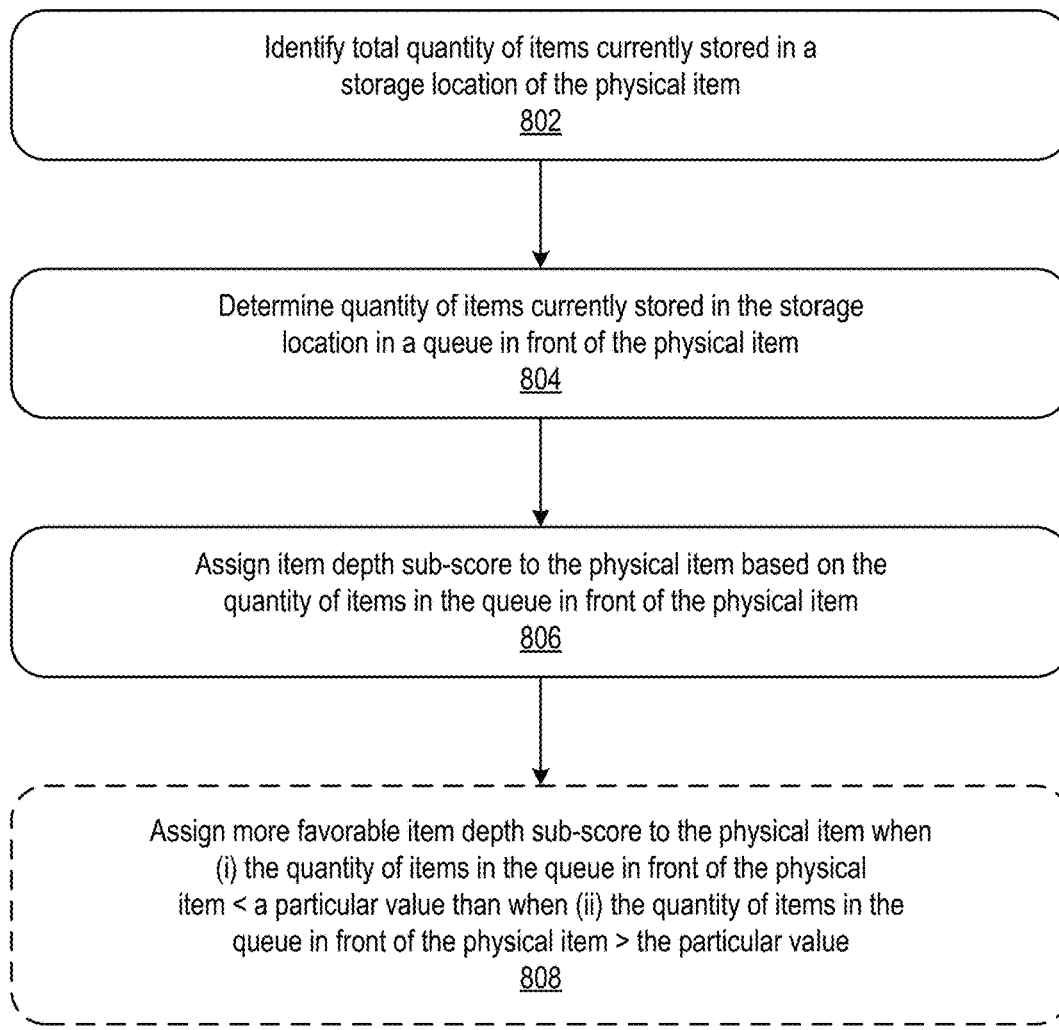
FIG. 8 is a flowchart of a process for determining an item depth sub-score for the physical item.

FIG. 8 is a flowchart of a process 800 for determining an item depth sub-score for the physical item. FIG. 13E depicts using the item depth sub-score of FIG. 8 when selecting the physical item for the picking request. The process 800 can be performed by the computer system 102. As mentioned in reference to FIG. 2, the process 800 can be performed for each of the physical items in the set of available physical items that can fulfill the picking request.

Referring to the process 800, the computer system 102 can identify a total quantity of items currently stored in a storage location of the physical item in 802. The computer system 102 can retrieve information from the WMS or a database about how many items are currently stored at the storage location. Sensors or cameras can also be positioned around, near, and/or inside the storage location and configured to capture image data of the items in the storage location. The computer system 102 can then use the image data to determine a total quantity of items currently stored at the storage location.

The computer system 102 can then determine a quantity of items currently stored in the storage location in a queue in front of the physical item (804). Using the same or similar techniques as described in reference to block 802, the computer system 102 can determine how many currently stored items are positioned in front of the physical item. This can indicate how far back in the storage location the physical item is located. In some implementations, the queue can include items moving in and out of the storage location, along an aisle leading to the storage location, on carts in the aisle, on lift mechanisms, and/or on mechanical moving systems.

The computer system 102 can assign the item depth sub-score to the physical item based on the quantity of items in the queue in front of the physical item in 806.

Additionally or alternatively, a more favorable item depth sub-score can be assigned to the physical item when (i) the quantity of items in the queue in front of the physical item is less than a particular value than when (ii) the quantity of items in the queue in front of the physical item is greater than the particular value (808). For example, if only 1 item is in front of the physical item, the physical item can be assigned a more favorable item depth sub-score than if 4 items are in front of the physical item and the physical item is the last item in the queue. As another example, if the physical item is at the front of the queue and therefore unobstructed by other items, the physical item can be assigned the most favorable sub-score, which can be 0. If the physical item is at the back of the queue, the item can be assigned the least favorable sub-score, which can be 5 on a 1-5 scale. To improve facility efficiency, it can be desired or preferred for physical items at front positions in the storage locations to be removed first instead of digging through items to pull out items farther away from the front of the storage locations. Removing a physical item in a front position can be less costly and less of an impediment since fewer or no other items currently stored at the location may need to be moved to reach the physical item.

In some implementations, as depicted and described in reference to the picking velocity sub-score in the process 700, a more favorable item depth sub-score can be assigned to the physical item when many items are queued in front of it (e.g., the physical item is closer to a back of the queue) and the storage location has available capacity. It can be advantageous to move around the items queued in front of the physical item to remove the physical item at a current time rather than a later time. At the later time, there can be more traffic. If the storage location is full or nearly full at the later time, then moving the items queued in front of the physical item can be a more timely process, which can cause traffic and/or congestion in the storage location, an aisle leading to the storage location, and the overall facility.

As shown in FIG. 13E, 3 items are queued in front of item 112A in storage location 115A. 0 items are queued in front of item 112B in storage location 113A and 1 item is queued in front of item 112C in storage location 113D. Relative to items 112B and 112C, item 112A has the most number of items queued in front of it, so item 112A can be assigned the least favorable item depth sub-score of 5. Moreover, since the location 115A is mostly full, it can be even less desirable to try and pick the item 112A from the back position, position 4.

Item depth can be compared between items 112B and 112C (item 1308 in FIG. 13E). Item 112B is in a first position, position 1, in the location 113A. Item 112C is in a second position, position 2, in the location 113D. Since no items are in a queue in front of item 112B, item 112B can be assigned the most favorable item depth sub-score of 1. In some implementations, since item 112B is in the first position, the most favorable item depth sub-score can be 0.

FIG. 9 is a flowchart of a process 900 for determining a type sub-score for the physical item. FIG. 13D depicts using the type sub-score of FIG. 9 when selecting the physical item for the picking request. The process 900 can be performed by the computer system 102. As mentioned in reference to FIG. 2, the process 900 can be performed for each of the physical items in the set of available physical items that can fulfill the picking request.

Referring to the process 900, the computer system 102 can determine a quantity of storage items having a same particular type as the physical item that are stored at a storage location of the physical item (902). The same type can be identified based on a perishable date, storage temperature, SKU, customer identifier, product, outbound date, and/or delivery date. One or more additional or other factors can be considered to determine that one or more items within the warehouse are of the same type as the storage item. When the computer system 102 receives the picking request (e.g., refer to FIG. 2), the picking request can include the particular type as the physical item. The computer system 102 can then, in block 902, retrieve information about items currently stored at the storage location of the physical item. The information can be stored by the WMS and/or in a database. The information can include item type(s).

The computer system 102 can assign the type sub-score to the physical item based on the particular type of the physical item in 904. Additionally or alternatively, a more favorable type sub-score can be assigned to the physical item when (i) the quantity of storage items having the same particular type as the physical item is less than a particular value than when (ii) the quantity of storage items having the same particular type as the physical item is greater than or equal to the particular value (906).

For example, if all the items in the storage location are of a first type and the physical item is a second type that is different than the first type, then the physical item can be assigned a more favorable type sub-score. After all, it can be preferred to store items of the same particular type in a storage location. Storing items of the same type in one location can be advantageous to reduce an amount of time needed to pick and/or organize items of the same type.

As another example, if a certain quantity or percentage of items in the storage location are of the same type as the physical item and that quantity or percentage exceeds a threshold value, then the physical item can be assigned a less favorable type sub-score. The less favorable type sub-score can indicate that there are enough items of the same type to be stored in the location that the physical item may not be considered an anomaly or a less efficient use of space in that location. The threshold value can indicate a predicted, estimated, or expected amount of the item that can be pulled at any given time. Therefore, if the storage location has, at a minimum, a quantity of the same type of item that can be pulled or requested in bulk in the future, then it can be determined that the physical item should be assigned a less favorable type sub-score and should remain in the storage location.

In some implementations, same items can be stored in different storage locations to avoid bottlenecks in the future when picking the same items, especially if the items are to be picked in bulk. In such an example, where the quantity of items currently stored in the respective storage location having the same type as the physical item is less than the particular value, the physical item can be assigned a less favorable score. Therefore, the physical item can remain in the storage location to ensure continued diversity of item type within that location. In yet other implementations, a location having a certain number of the same items currently stored there can be assigned a more favorable score if the location should not store more of the same item. Therefore, the physical item can be removed from the storage location so as to not exceed a predefined quantity of items of the same type that should be stored at the location.

As shown in the example in FIG. 13D, items 112A, 112B, and 112C are all the same type: bananas. In other implementations, each of the items 112A, 112B, and 112C can be of different item types. Item 112A is stored in location 115A, which has 100 units of bananas, the same type as the item 112A. Item 112A can receive a least favorable type sub-score of 5 since it can be preferred to store all the same type items in one location. The same type item quantities for locations 113A and 113D, with respect to items 112B and 112C can be compared (item 1306 in FIG. 13D). Item 112B is stored in location 113A, which can have 15 units of the same type item as item 112B. Item 112C is stored in location 113D, which can have 50 units of the same type of item as the item 112C. Since location 113A has the smallest quantity of same type items, item 112B can receive the most favorable type sub-score of 1. This low value score can indicate that the item 112B should be selected to fulfill the picking request so that the item 112B can be removed from the location 113A. After all, the location 113A does not store many items of the same type and it can be desirable in this facility to store items of the same type in the same locations.

Figure 10A:
FIGS. 10A-B is a flowchart of a process for determining a fill capacity sub-score for the physical item.
Figure 10B:
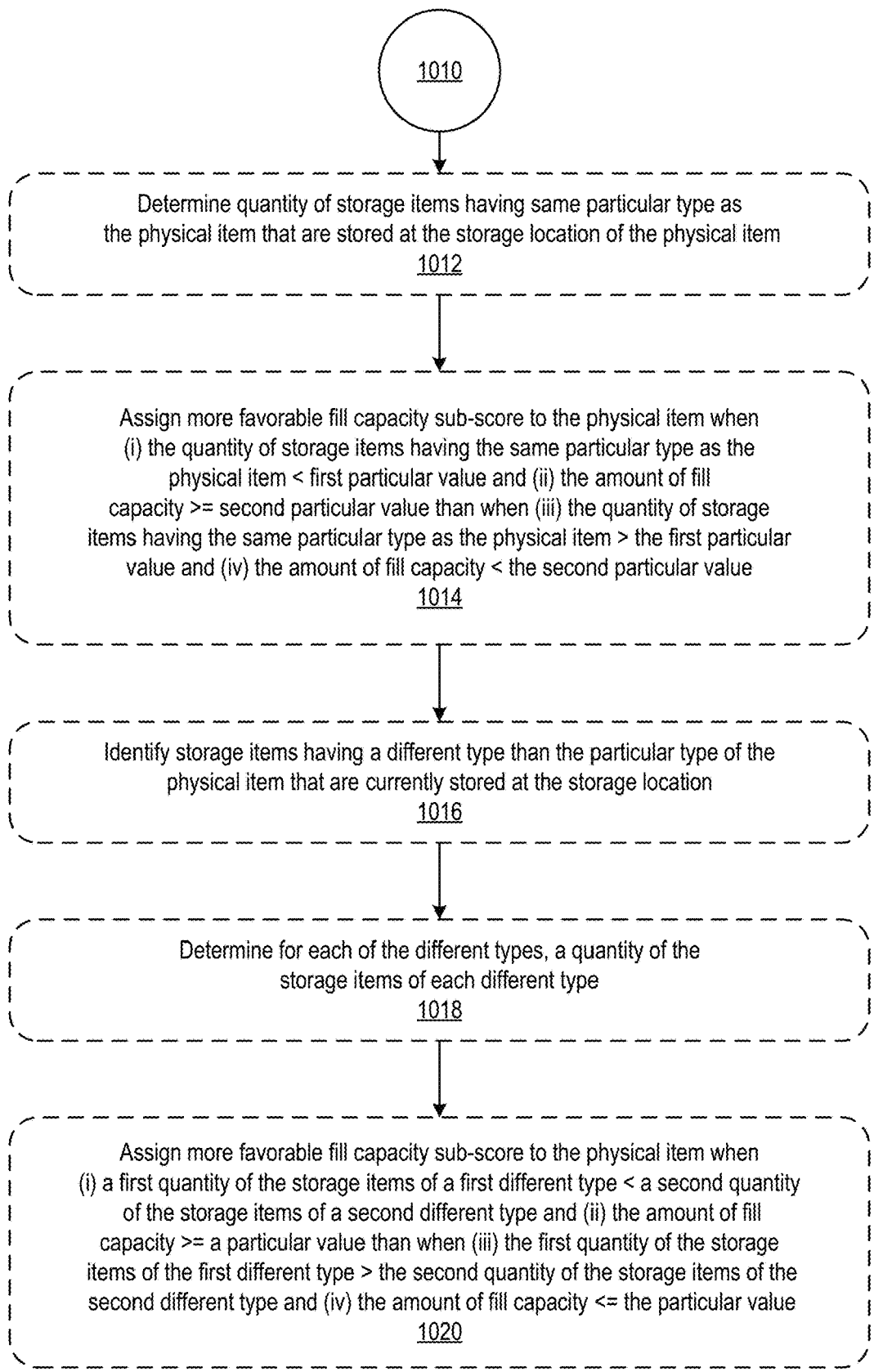

FIGS. 10A-B is a flowchart of a process 1000 for determining a fill capacity sub-score for the physical item. FIG. 13F depicts using the fill capacity sub-score of FIG. 10 when selecting the physical item for the picking request. The process 1000 can be performed by the computer system 102. As mentioned in reference to FIG. 2, the process 1000 can be performed for each of the physical items in the set of available physical items that can fulfill the picking request.

Referring to the process 1000 in both FIGS. 10A-B, the computer system 102 can determine a quantity of storage items currently stored at a storage location of the physical item in 1002. The computer system 102 can determine a total number of storage items that can be stored at the storage location in 1004. As described in reference to block 802 in the process 800 (e.g., refer to FIG. 8), the computer system 102 can retrieve information from the WMS or a database about how many items are currently stored at the storage location and how many items the storage location can store at a given time. Sensors or cameras can also be positioned around, near, and/or inside the storage location and configured to capture image data of the items in the storage location. The computer system 102 can then use the image data to determine a total quantity of items currently stored at the storage location.

The computer system 102 can determine an amount of fill capacity for the storage location in 1006. The amount of fill capacity can be determined based on comparing the quantity of storage items currently stored to the total number of storage items that can be stored at the storage location. For example, the quantity of currently stored items can be divided by the total number of storage items that can be stored at the storage location. The resulting value can be normalized and/or multiplied by 100 to determine a percent value for the amount of fill capacity. In some implementations, the amount of fill capacity can be a numeric value other than a percentage.

The computer system 102 can assign the fill capacity sub-score to the physical item based on the amount of fill capacity in 1008. For example, the fuller the storage location, the higher numeric value or less favorable score can be assigned to the physical item. This is because it can be desirable to keep storage locations full in the facility rather than partially or completely empty.

Alternatively or additionally, the computer system 102 can assign a more favorable fill capacity sub-score to the physical item when (i) the amount of fill capacity is less than a particular value than when (ii) the amount of fill capacity is greater than or equal to the particular value (1010). The particular value can be different for each storage location. For example, some storage locations can be designated as temporary storage locations. In those locations, it can be preferred to have a lower fill capacity and a lower particular value. Other storage locations can be designated for longer term storage and therefore, it can be preferred to have a higher fill capacity and a higher particular value. In some implementations, the particular value can be different for each facility.

In some implementations, if the fill capacity is less than full (e.g., a higher particular value), then the physical item can be assigned a more favorable score. This can indicate that the storage location is not close to being full, so it can be more efficient to empty the storage location of items, such as the physical item, so that the location can be filled with incoming items. For example, if the physical item is the only item in the storage location, the physical item can be assigned the most favorable score so that the item can be removed and the location can be empty. Once the location is empty, it can more easily and quickly receive incoming items.

In some implementations, the particular value can be associated with a half full capacity (e.g., 50% fill capacity). If the physical item is in a storage location that is more than 50% full, then the physical item can be assigned a less favorable score than a physical item in a storage location that is less than or equal to 50% full. The physical item in the location that is less than or equal to 50% full can be removed from the location such that the location can be emptied. Once the location is empty (e.g., 0% full), the location can be used to fill to capacity with incoming items. This can be advantageous to optimize on usage of storage space in the facility.

If the fill capacity is greater than or equal to the threshold or particular value associated with being full, the physical item can be assigned a less favorable score. As mentioned above, the less favorable score can indicate that the storage location is full or is close to being full and it can be more efficient to leave the storage location full. Therefore, the physical item should remain in the storage location. Removing the physical item can, for example, make it challenging to find items that can meet the storage requirements for that storage location (e.g., weight, size, item type, etc.), which may reduce storage optimization.

For example, as shown in FIG. 13F, item 112B is stored in a location that is least filled. Item 112A is in location 115A, which is at 75% fill capacity, item 112B is in location 113A, which is at 25% fill capacity, and item 112C is stored in location 113D, which is at 50% fill capacity. In this example, the particular value can be 50% for all storage locations in the facility. Item 112A's storage location 115A has a fill capacity of 75%, which is well above the 50% threshold level. Item 112A can be assigned the least favorable fill capacity sub-score. Because the location 115A is nearly full, the location 115A should remain filled—removing items from a nearly full location can be less efficient and more timely than removing items from a nearly empty location. Thus, the fill capacities of storage locations 113A and 113D can be compared (item 1310 in FIG. 13F). Storage location 113D's fill capacity is just at the threshold of 50% while location 113A's fill capacity of 25% is well below the threshold capacity of 50%. Therefore, the item 112B, which is stored in the storage location 113A, can be assigned the most favorable fill capacity sub-score in comparison to the item 112C, which is stored in the location 113D. Since the storage location 113A is closer to being empty than the storage location 113D, it can be more efficient, less timely, less costly, and a better use of storage space if item 112B is removed from the location 113A. As a result, items can continue to be picked from location 113A until location 113A has 0% fill capacity. Then location 113A's space can be optimized and used to store incoming items. It can be desired to clear out a location such that the location can be used for storing one type of items, used as a temporary storage location, and/or any other conditions.

Referring back to the process 1000 in FIGS. 10A-B, the computer system 102 can determine a quantity of storage items having the same particular type as the physical item that are stored at the storage location of the physical item (1012). The items having the same type as the physical item can be determined using similar or same techniques as described in reference to block 902 in the process 900 (e.g., refer to FIG. 9).

The computer system 102 can assign a more favorable fill capacity sub-score to the physical item when (i) the quantity of storage items having the same particular type as the physical item is less than a first particular value and (ii) the amount of fill capacity is greater than or equal to a second particular value than when (iii) the quantity of storage items having the same particular type as the physical item is greater than the first particular value and (iv) the amount of fill capacity is less than the second particular value (1014). It can be preferred to have a full storage location of a same type of item rather than a mix of different items. Therefore, assigning the more favorable fill capacity sub-score when (i) and (ii) are satisfied can be advantageous to remove the physical item if it is a different type than most of the items currently stored in the nearly-full or full location. Same items can be stored together and can fill storage locations, thereby making it (i) more efficient to pick items of the same type in bulk and (ii) organize stock in the facility.

In some implementations, even if the location is half full or full, if there are many different types of items stored therein, it can be desirable to assign the physical item with a more favorable fill capacity sub-score. The physical item can be removed and then subsequent items of different types can be removed until the storage location contains items of the same type. The storage location can then be filled with items of only the same type.

Moreover, the computer system 102 can identify storage items having a different type than the particular type of the physical item that are currently stored at the storage location (1016). Identifying and quantifying the items of different types from the physical item can be advantageous to prioritize which of the different types of items should be kept in the storage location and/or moved.

The computer system 102 can determine, for each of the different types, a quantity of the storage items of each different type in 1018. The computer system 102 can then assign a more favorable fill capacity sub-score to the physical item when (i) a first quantity of the storage items of a first different type is less than a second quantity of the storage items of a second different type and (ii) the amount of fill capacity is greater than or equal to a particular value than when (iii) the first quantity of the storage items of the first different type is greater than the second quantity of the storage items of the second different type and (iv) the amount of fill capacity is less than or equal to the particular value (1020). In other words, to prioritize removing items of different types, the different types of items in the location can be identified and quantities of each of the different types can be compared. Types that have smaller quantities of items can be prioritized and removed first because it can be easier, faster, and more efficient to move smaller quantities of items than it can be to move larger quantities of items. Then, in some implementations, once the smaller quantity of items of one type are removed, the storage location can be filled with more items of the same type as the larger quantity of items currently stored therein.

One or more of the blocks 1012-1020 can be optionally performed in the process 1000.

FIG. 11 is a flowchart of a process 1100 for determining a task quantity sub-score for the physical item. FIG. 13H depicts using the task quantity sub-score of FIG. 11 when selecting the physical item for the picking request. The process 1100 can be performed by the computer system 102. As mentioned in reference to FIG. 2, the process 1100 can be performed for each of the physical items in the set of available physical items that can fulfill the picking request.

Referring to the process 1100, the computer system 102 can identify a room where a storage location of the physical item is located in 1102. The computer system 102 can, for example, retrieve information from the WMS or a database indicating the room that the storage location is located within. The retrieved information can also include information about what devices, vehicles, or systems operate within each of the rooms.

For example, each room in the facility can have multiple storage locations and aisles. For example, as described herein (e.g., refer to FIG. 1), each aisle can represent a level within the room and each aisle can service a plurality of storage locations. Lifting mechanisms, such as elevators and/or cranes, can service each of the aisle. Carts or other warehouse vehicles can move items along the aisle to each of the storage locations. In some implementations, one or more cranes can service multiple aisles and storage locations at a given time. Each room in the facility can have a different number of storage locations, aisles, lifting mechanisms, and/or aisle carts.

The computer system 102 can receive information about inbound and outbound tasks for a group of one or more lift mechanisms that service a group of storage locations in the identified room that includes the storage location of the physical item (1104). The received information can include real-time data about items moving in the one or more lift mechanisms, aisles, and/or the overall room. For example, the computer system 102 can receive information about the inbound and outbound tasks for the one or more lift mechanisms from the WMS. The computer system 102 can also receive real-time sensed data from sensors or cameras positioned in the facility that depict current traffic or movement conditions to and from the room of the storage location. This information can also be received from cameras and/or other sensors positioned on forklifts or other autonomous vehicles (e.g., GPS or location sensors) moving throughout the facility. Real-time information can be received from sensors about movement in rooms, aisles and/or movement towards a room, an aisle, or storage Example information received from the WMS can include routes that items and/or warehouse vehicles are taking throughout the warehouse and projected traffic or movement times through each of the rooms and/or aisles in the facility. Using this information, the computer system 102 can determine current as well as projected traffic or movement conditions for the one or more lift mechanisms in the room of the storage location.

The computer system 102 can determine a quantity of tasks queued for the one or more lift mechanisms in the identified room in 1106. The computer system 102 can make this determination based on the information received from the WMS and/or the real-time sensed data from cameras and/or sensors in the facility. In some implementations, a quantity of queued tasks can be based on a quantity of forklifts or other warehouse vehicles that are currently moving in the one or more lift mechanisms in the identified room. In some implementations, the quantity of queued tasks can be based on a quantity of items currently being moved in the one or more lift mechanisms in the identified room. The quantity of queued tasks can also be based on tasks that are going to be completed within a predetermined amount of time and/or tasks that are currently being completed in aisles, storage locations, or other portions of the room that use the one or more lift mechanisms in the identified room.

The computer system 102 can also weight a quantity of outbound tasks more heavily than a quantity of inbound tasks in 1108. Outbound tasks can be weighted more heavily because the computer system 102 is trying to determine preferred items to pick to complete outbound tasks. Outbound traffic can cause delays for outbound tasks, which can make it more challenging to fulfill picking requests.

The task quantity sub-score can be assigned to the physical item based on the quantity of tasks queued (1110). The task quantity sub-score can indicate how much traffic is currently associated with the overall room of the storage location, and, more specifically, one or more lift mechanisms within the room that are used to access the storage location of the physical item. In some implementations, the task quantity sub-score can also indicate how much traffic is projected for the overall room of the storage location.

Additionally or alternatively, the computer system 102 can assign a more favorable task quantity sub-score to the physical item when (i) the quantity of tasks queued is less than a particular value than when (ii) the quantity of tasks queued is greater than the particular value (1112). Rooms having more traffic can be avoided in comparison to rooms having less traffic. Therefore, if the physical item is stored in a location in a room that is experiencing little to no traffic, the physical item can be assigned a more favorable task quantity sub-score. It can be more efficient to pick the physical item from that room than it can be to pick a different physical item in another room that is experiencing more traffic. Additionally, rooms having more outbound traffic can be avoided in comparison to rooms having more inbound traffic. The outbound traffic can cause delays in fulfilling picking requests and other outbound tasks.

In some implementations, the particular value can be different for each room in the facility. For example, rooms that are farther away from a destination picking location can have a larger particular value than rooms that are closer to the destination picking location. It can be more efficient to pick items from rooms that are closer to the destination picking location, even if they have more traffic than a farther away room because it can take less overall time to move the item from the closer location to the destination picking location.

The particular value can be a number of items allowed on the one or more lift mechanisms at a given time, wherein that number can avoid congestion within the associated room. The particular value can also be a number of tasks that can be allowed on the one or more lift mechanisms at a given time. The particular value can also be based on a size, weight, and/or type of items that can be moved by the one or more lift mechanisms.

As shown in FIG. 13H, storage location, room of the storage location, and quantity of queued tasks for the room can be identified for each of the available physical items 112A, 112B, and 112C. Item 112A is in storage location 115A, which is located in room 111N. 4 tasks are queued for the room 111N. In comparison, item 112B is in storage location 113A, which is located in room 111A. 1 task is queued for the room 111A. Similarly, item 112C is in storage location 113D, which is located in room 111A, which has 1 task queued. Since item 112A's room has the most tasks queued, item 112A can receive the least favorable task quantity sub-score. Task quantities for items 112A and 112B can be compared (item 1314 in FIG. 13H). Rooms 111A and 111A can have the same quantity of queued tasks because the rooms can be serviced by the same one or more lift mechanisms. In other implementations, the storage locations 113A and 113d can be in the same room 111A but serviced by different lift mechanisms.

Because the storage locations 113A and 113D are in the same room 111A having the same low quantity of queued tasks, items 112B and 112C can be assigned same task quantity sub-scores. Although not depicted, the task quantity sub-scores for the items 112B and 112C can be further adjusted based on one or more other parameters. For example, distances between each of the storage locations for each of the items 112B and 112C and the one or more lift mechanisms servicing the room 111A can be compared. The item having the shorter distance can be assigned the more favorable task quantity sub-score. In implementations where the storage locations 113A and 113D are serviced by different lift mechanisms but have the same quantity of queued tasks in the same room, the computer system 102 can identify information about the tasks queued for each of the lift mechanisms. For example, if the lift mechanisms serving the storage location 113A is assigned 1 outbound task and the lift mechanisms servicing the storage location 113D is assigned 1 inbound task, then the item 112C in location 113D can be assigned the more favorable score. After all, inbound tasks can be less cumbersome on efficiency to complete picking requests than outbound tasks.

Referring back to the process 1100 in FIG. 11, a physical item in a location whose route requires passing through one or more lift mechanisms experiencing traffic, bottlenecks, or congestion can be assigned a less favorable sub-score than a physical item whose route includes passing through one or more lift mechanisms that are not experiencing traffic, bottlenecks, or congestion. Alternatively or additionally, the task quantity sub-score can be based on one or more factors including but not limited to (i) a number of items permitted in the one or more lift mechanisms at a given time, (ii) sizes of the items currently being moved, (iii) weights of the items currently being moved, (iv) types of the items currently being moved, and/or (v) projected traffic time. Moreover, as mentioned above, real-time traffic conditions can be received in real-time and used to adjust, by the computer system 102, the task quantity sub-scores.

FIGS. 12A-B is a flowchart of a process 1200 for determining an aisle task sub-score for the physical item. FIG. 13G depicts using the aisle task sub-score of FIGS. 12A-B when selecting the physical item for the picking request. The process 1200 can be performed by the computer system 102. As mentioned in reference to FIG. 2, the process 1200 can be performed for each of the physical items in the set of available physical items that can fulfill the picking request.

Referring to the process 1200 in both FIGS. 12A-B, the computer system 102 can identify a room where a store location of the physical item is located in 1202. The room can be identified using same or similar techniques as described in reference to block 1102 in the process 1100 (e.g., refer to FIG. 11). The computer system 102 can then select an aisle in the room that is used to access the storage location in 1204. As previously mentioned, the each aisle in the room can service multiple storage locations. Moreover, each aisle can represent a different level in the room.

The computer system 102 can receive information about inbound and outbound tasks for the selected aisle in 1206. The information can be received using the same or similar techniques as described in reference to block 1104 in the process 1100. The received information can be associated with items that are being moved through the aisle (i) to be stored in one or more storage locations along the aisle and/or (ii) to be moved from one or more of the storage locations to other storage locations or other destination locations in the facility (e.g., a destination picking location). As described in reference to the process 1100, outbound tasks can be weighted more than inbound tasks since the disclosed technology is related to selecting a physical item to fulfill a picking request, which can be an outbound task. Traffic, for example, caused by a queue of outbound tasks can cause delays or inefficiencies in completing the outbound tasks and/or the particular picking request that the computer system 102 is trying to complete. Traffic caused by inbound tasks may not have as much of an impact on delaying completion of a picking request.

In 1208, the computer system 102 can determine a quantity of tasks queued for the selected aisle. The quantity of queued tasks can be determined using the same or similar techniques as described in reference to blocks 1106-1108 in the process 1100.

Next, in step 1210, the computer system 102 can assign the aisle task sub-score to the physical item based on the quantity of tasks queued for the selected aisle. As described in reference to the process 1100 in FIG. 11, the aisle task sub-score can indicate traffic in the aisle that services the storage location of the physical item. The more traffic in the aisle, the more likely the physical item will be assigned a less favorable sub-score. It can be desirable to assign a more favorable sub-score to a physical item that is serviced by an aisle experiencing little, minimal, or no traffic. More specifically, the aisle task sub-score can indicate traffic for a particular cart that services the selected aisle. In some implementations, the aisle may have one cart that moves items back and forth in the aisle, including both inbound and outbound tasks. In some implementations, the aisle may have multiple carts that move items back and forth in the aisle. In such scenarios, the more carts an aisle has, the more likely the aisle has less overall traffic (since items can be moved more quickly in the aisle), and therefore a more favorable aisle task sub-score can be assigned to a physical item that is in a storage location serviced by that aisle.

Additionally or alternatively, the computer system 102 can assign a more favorable aisle task sub-score to the physical item when (i) the quantity of tasks queued for the selected aisle is less than a particular value than when (ii) the quantity of tasks queued for the selected aisle is greater than the particular value (1212). The particular value can be different for each aisle and/or for each room. In some implementations, the particular value can be the same for every aisle and/or room in the facility. In some implementations, the particular value can dynamically change based on real-time traffic conditions in the aisle, room, and/or facility. If the quantity of tasks queued for the selected aisle is less than the particular value, this can indicate that the aisle is currently experiencing little, minimal, or no traffic. Therefore, it can be more desirable, more efficient, and faster to pick the physical item in the storage location that is serviced by the aisle. On the other hand, if the quantity of tasks queued for the selected aisle is greater than the particular value, this can indicate that the aisle is experiencing some level of traffic. This traffic can cause delays in completing the picking request should the physical item in the storage location serviced by this aisle be assigned a more favorable aisle task sub-score.

Additionally or alternatively, the computer system 102 can assign a more favorable aisle task sub-score to the physical item based on one or more factors (1214). The factors include but are not limited to (i) number of storage items permitted in the selected aisle at a given time, (ii) sizes of storage items currently being moved in the selected aisle, (iii) weights of storage items currently being moved in the selected aisle, (iv) types of storage items currently being moved in the selected aisle, and (v) projected traffic time in the selected aisle. Moreover, as mentioned in reference to the process 1100, the aisle task sub-score can be adjusted in real-time based on real-time traffic conditions to and from the aisle.

As shown in the example of FIG. 13G, for each of the candidate items 112A, 112B, and 112C, a respective storage location's aisle and quantity of queued tasks associated with that aisle can be identified. In this example, item 112A, which is in storage location 115A, can be serviced by aisle 116A. Aisle 116A has 2 queued tasks. Item 112B, which is in storage location 113A, is serviced by aisle 110A. Aisle 110A has 0 queued tasks. Item 112C, which is in storage location 113D, is serviced by aisle 110N. Aisle 110N has 1 queued task. Because item 112A's aisle 116A has the most amount of queued tasks, item 112A can be assigned the least favorable aisle task sub-score, with a numeric value of 3. The computer system 102 can then compare the aisle task quantities associated with items 112 and 112B (item 1312 in FIG. 13G). Since item 112B's aisle 110A has 0 tasks queued, item 112B can be assigned a more favorable aisle task sub-score than item 112C. Item 112B's most favorable aisle task sub-score can indicate that removing item 112B from the storage location 113A can be less costly (e.g., more efficient, less or no traffic) than removing either item 112C from location 113D or item 112A from location 115A.

Although not depicted, one or more additional parameters can be used by the computer system 102 to determine any of the aforementioned sub-scores and/or the aggregate score for the physical item. For example, characteristics about the storage location can be used to adjust the sub-scores and/or the aggregate score. In some implementations, a physical item in a storage location that is multi-deep can be weighted differently than a physical item in a storage location that is single-deep. Similarly, a physical item in a storage location that is a drive-in rack can be weighted differently than a physical item in a storage location that is a drive-through rack. For examples, if a physical item is in a back position of a storage location that is drive-through, the physical item may receive a more favorable item depth sub-score than a physical item in a back position of a storage location that is drive-in (refer to the process 800 in FIG. 8). An item in a back position of a drive-through storage location can be easier to reach than an item in a back position of a drive-in storage location because the former can be accessed without having to move other items positioned in front of the physical item. In the drive-in storage location, items in front of the physical item may have to be moved to access the storage item, which can cause inefficiencies in storage space and delays in picking the physical item and completing the picking request.

Additional parameters that can be used to determine any one of the sub-scores and/or the aggregate score for the physical item can include a compatibility comparison of characteristics about the physical item and the item's storage location. For example, a first set of characteristics about the physical item can be identified. The first set of characteristics can include but are not limited to a type of the item, a customer identifier, size of the item, weight of the item, and/or an amount of time for keeping the item in storage. A second set of characteristics can be identified about the storage location of the physical item. The second set of characteristics can include but are not limited to whether the storage location is single deep, double deep, a drive-through rack, a drive-in rack, automated, and/or manual. One of more of the sub-scores and/or aggregate score for the physical item can be adjusted based on whether one or more of the first set of characteristics are compatible with one or more of the second set of characteristics. The less compatible characteristics, the more heavily one or more sub-scores and/or the aggregate score can be weighted for the physical item. Therefore, the physical item can become more favorable to be picked relative to other items in the set of available physical items. Likewise, the more compatible characteristics, the less favorable the physical item can be for picking since it can be preferred to keep compatible items in their respective storage locations. Keeping compatible items in compatible storage locations can optimize on space usage as well as overall facility efficiency.

Alternatively or additionally, any one of the sub-scores and/or the aggregate score for the physical item can be based on one or more factors including but not limited to (i) a quantity of forklifts moving items in the warehouse exceeding a first threshold value, (ii) a quantity of the available physical items to complete the picking request exceeding a second threshold value, (iii) a quantity of lift mechanisms exceeding a third threshold value, (iv) a quantity of manual workers exceeding a fourth threshold value, and/or (v) the facility being automated. The threshold values described herein can dynamically change based on specifics about the facility, such as changes made to the facility's layout, structure, quantity of workers, quantity of working mechanical moving systems (e.g., conveyor belts), number of working forklifts or other autonomous vehicles, transition to an automated facility, transition to a manual facility, etc.

As an example, any one or more of the physical item's sub-scores and/or aggregate score can be weighted more heavily when a quantity of forklifts moving items around the facility exceeds a threshold amount. Although, in some scenarios, more movement may cause more congestion, more movement can also result in more items being routed throughout the facility. This can also result in shorter or fewer delays in moving items throughout the facility. When more forklifts are working, there can be enough movement in the facility for items to be moved without causing items to wait for significant periods of time, thereby causing less congestion or traffic in the future. On the other hand, if fewer forklifts are servicing a particular area in the facility where the physical item is located, any one or more of the physical item's sub-scores and/or aggregate score can be weighted less since the fewer forklifts can cause delays in picking the item and moving it to a destination picking location.

As another example, in some implementations, any one or more of the sub-scores and/or aggregate score of the physical item can be weighted more if the facility is automated. Automation can indicate that items can be moved around the facility more efficiently and/or to more locations in the facility than if only human workers were tasked with moving items. If, on the other hand, the facility is manual, one or more of the sub-scores and/or aggregate score of the physical item can be weighted less. A manual facility may be less efficient in terms of picking, shifting, moving, and/or relocating items when fulfilling inbound and/or outbound tasks. Items may not be moved around the facility as quickly as in an automated facility, so it can be more desirable to consolidate the items into fewer locations and pick items from fewer locations that are closer to a destination picking location, for example. This can result in improved efficiency and reduced congestion in stowing and retrieving items, especially if items having different picking rates are stored together.

Moreover, the weights described above can be situation- or facility-specific. In some facility settings, it can be desired to spread out like items rather than grouping them together in order to reduce bottlenecks where mass retrieval of like items may be required. In other facility settings, it can be desired to keep like items together so that they are easier and/or faster to retrieve/pick in bulk. Moreover, the latter can be preferred where mass retrieval may not historically be a trend in the facility setting. Thus, any one or more of the sub-scores and/or aggregate score for the physical item can be adjusted based on whether requirements of the physical item are compatible or aligned with specifications of the item's storage location.

The sub-scores described in reference to FIGS. 3-12 can be weighted to reach a lowest cost or most favorable overall score for each physical item in the set of available physical items. The physical item with the lowest cost score (e.g., most favorable score) can be selected to fulfill the picking request, as described herein. In some implementations, weights can be initially simulated. Machine learning and/or deep learning techniques and algorithms can be used to improve and generate a weighting scale for the sub-scores. Training can be performed on historic trends and data. Training can also be continuously performed to determine updated weights specific to particular seasons, customers, types of items stored in the facility, etc.

Some sub-scores can be weighted more than others, which can also be based on specifics of a particular facility, as described above (e.g., an automated facility can place more emphasis on some sub-scores versus a manual facility, where a task quantity sub-score can be the most important sub-score). For example, each of the sub-scores can start with default weights and, using machine learning, parameters and weights can be fine-tuned based on specific conditions or layouts of the facility that are determined historically and/or in real-time.

Moreover, as described, a lower number score value can be an indication that the physical item is more favorable item for picking than another physical item having a higher number score value. Weights can be modified to more distinctly identify or differentiate lower number score values from higher number score values. As another example, it may be desired in some facility settings to assign a higher number score value as an indication of a more favorable score and a lower number score value as an indication of a less favorable score.

Figure 14:
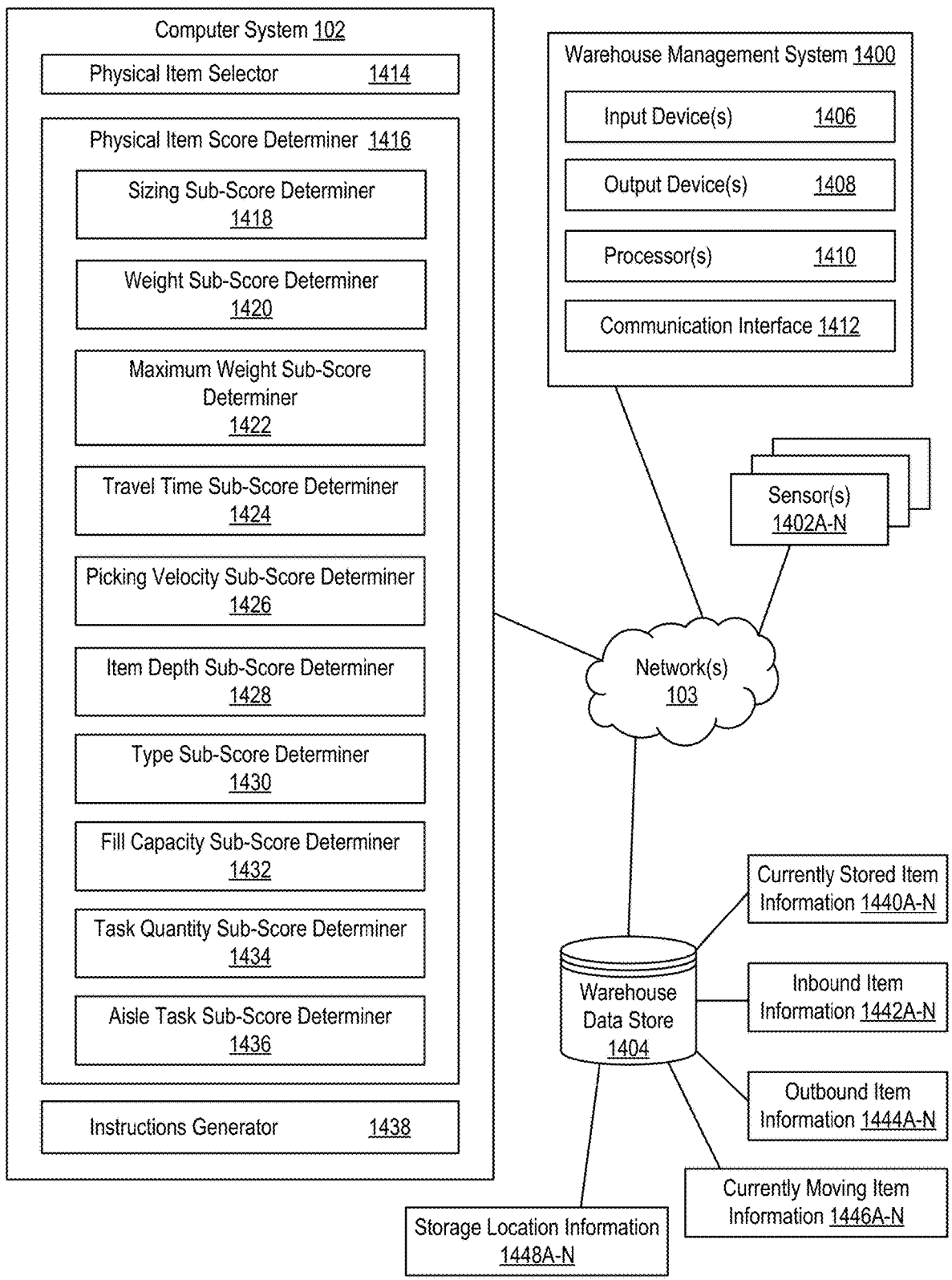
FIG. 14 is a system diagram of components that may be used to implement the technology described herein.

FIG. 14 is a system diagram of components that may be used to implement the technology described herein. The computer system 102, warehouse management system (WMS) 1400, sensors 1402A-N, and warehouse data store 1404 communicate (e.g., wired and/or wireless) over the network(s) 103.

The warehouse data store 1404 can store information such as currently stored item information 1440A-N, inbound item information 1442A-N, outbound item information 1442A-N, currently moving item information 1446A-N, and storage location information 1448A-N. The information 1440A-N, 1442A-N, 1444A-N, and 1446A-N can be profiles for storage items that are dynamically updated as real-time conditions are sensed in the facility (e.g., by the sensors 1402A-N) or facility workers or users provide input updates to the WMS 1400 at a computing device (e.g., mobile device, tablet, wearable device, computer, etc.).

For example, the currently stored item information 1440A-N can be updated to include an identifier for a location where the item is currently stored. As another example, the inbound item information 1442A-N can be updated as the inbound item is scanned and/or processed at a docking/unloading area. As yet another example, the currently moving item information 1446A-N can be updated as the moving item is scanned or processed at different checkpoints along a route in the facility, whether to a storage location or to a destination picking location. The outbound item information 1444A-N can be updated with identifiers pertaining to a picking request that is being fulfilled by the item, a customer who requested the picking, and/or a destination picking location for the item. The storage location information 1448A-N can also be dynamically updated. For example, the information 1448A-N can be updated with identifiers for items that are currently stored therein.

Some of the information 1440A-N, 1442A-N, 1444A-N, 1446A-N, and 1448A-N can include but are not limited to a facility code, location name of the item, item name, location coordinates of the item (in x, y, and z directions), an average/historic picking rate, pallet platform type, product master information, owner code, item code, pallet code, code date, set of putaway rooms (can be empty), set of putaway aisles or modules (can be empty), case quantity, length, height, width, case height, gross weight, temperature zone, location name, location room, location module/aisle, location bay, location level, location coordinates (in x, y, and z directions), location velocity percentile (e.g., average picking rate or movement of items in and out of the location), location temperature zone, location maximum height, location maximum weight, location capacity (e.g., maximum number of items or pallets), location type (e.g., FIFO or LIFO), set of items currently stored in the location (can be empty), depth in the location (for multi-deep locations), and data about team members currently assigned to move items throughout the warehouse. As described throughout, this information can be used by the computer system 102 to determine favorability sub-scores for each available physical item and selecting the most favorable physical item to complete a picking request.

The WMS 1400 can be configured to capture information about items, locations, and users in the warehouse. The information can be received from users in the warehouse, for example, via applications presented to the users at computing devices. The information can also be received automatically from devices and/or sensors (e.g., the sensors 1402A-N) throughout the warehouse, including but not limited to GPS or location sensors or cameras (e.g., stereoscopic cameras, LIDAR sensors, etc.) on forklifts or autonomous warehouse vehicles and/or sensors placed throughout the warehouse. The WMS 1400 can also be configured to store and access information 1440A-N, 1442A-N, 1444A-N, 1446A-N, and 1448A-N in the warehouse data store 1404.

As described herein, the WMS 1400 can soft-allocate physical items into groups, wherein each group can contain items that can be picked to fulfill different picking requests, orders, or other outbound tasks. This soft-allocation can occur before picking requests are received by the WMS 1400, which can result in more efficient selection of a physical item to complete the picking requests. When a picking request is received, the WMS 1400 may not have to determine which physical items currently stored in the facility can potentially be used to fulfill the request. Instead, the WMS 1400 can transmit, to the computer system 102, the group of physical items that were previously soft-allocated for processing and scoring by the computer system 102. The WMS 1400 can also provide additional information (e.g., information stored in the data store 1404) to the computer system 102 that the system 102 can use for determining favorability scores for the group of available physical items.

The WMS 1400 can include input device(s) 1406, output device(s) 1408, processor(s) 1410, and a communication interface 1412. The input device(s) 1406 can include a touch screen display, keyboard, mouse, audio recorders, or any other devices that can be used to capture information (e.g., from a user like a warehouse worker). The output device(s) 1408 can include a touch screen display or other form of display or other device that can be used to provide/present information to a user. The processor(s) 1410 can be configured to perform one or more operations when executed. The communication interface 1412 can be configured to provide for communication between one or more of the components described herein.

The computer system 102 can include a physical item selector 1414, a physical item score determiner 1416, and an instructions generator 1438. The system 102 can include one or more additional or fewer components to perform the techniques described herein. The physical item selector 1414 can be configured to select a physical item from the set or group of available physical items having the most favorable score (e.g., lowest cost) to complete the picking request. The physical item selector 1414 can make this determination for each physical item in the group of items that can potentially fulfill the picking request.

The physical item score determiner 1416 can be configured to determine an aggregate favorability score for each physical item in the set or group of available physical items that can complete the picking request. The determiner 1416 can include one or more additional engines or determiners configured to assess and assign favorability sub-scores. The determiner 1416 can then aggregate and optionally weight the sub-scores to identify an overall favorability score for each of the available physical items. The physical item score determiner 1416 can include a sizing sub-score determiner 1418 (e.g., refer to FIG. 3), a weight sub-score determiner 1420 (e.g., refer to FIG. 4), a maximum weight sub-score determine 1422 (e.g., refer to FIG. 5), a travel time sub-score determiner 1424 (e.g., refer to FIG. 6), a picking velocity sub-score determiner 1426 (e.g., refer to FIG. 7), an item depth sub-score determiner 1428 (e.g., refer to FIG. 8), a type sub-score determiner 1430 (e.g., refer to FIG. 9), a fill capacity sub-score determiner 1432 (e.g., refer to FIG. 10), a task quantity sub-score determiner 1434 (e.g., refer to FIG. 11), and an aisle task sub-score determiner 1436 (e.g., refer to FIG. 12). One or more additional or fewer determiners can be included in the physical score determiner 1416. For example, the determiner 1416 can have a determiner for each additional type of sub-score that is used to determine aggregate favorability scores for each of the available physical items. In some examples, where only some sub-scores are used to determine an aggregate favorability score, only determiners associated with the selected sub-scores can be included in the physical item determiner 1416. In some implementations, one or more of the determiners can be grouped together rather than as individual determiners.

The instructions generator 1438 can be configured to determine instructions for a physical item that is selected to complete the picking request. For example, once favorability scores are determined for each physical item in the group of available physical items by the determiner 1416, the physical item selector 1414 can select the physical item from the group that has the most favorable score (e.g., lowest cost, lowest numeric value). Information associated with the selected physical item (e.g., the storage location information 1448A-N) can be transmitted to the instructions generator 1438. The generator 1438 can also access information about the item from the data store 1404, such as a current location of the item. Using such information, the generator 1438 can determine a route and instructions for moving the item from its current location to the destination picking location. The generated instructions can be transmitted to one or more devices of workers in the warehouse (e.g., a worker tasked with picking the item and moving the item to the destination picking location), an autonomous vehicle configured to pick and/or move the physical item, and/or a mechanical moving system, as described herein.

Figure 15:
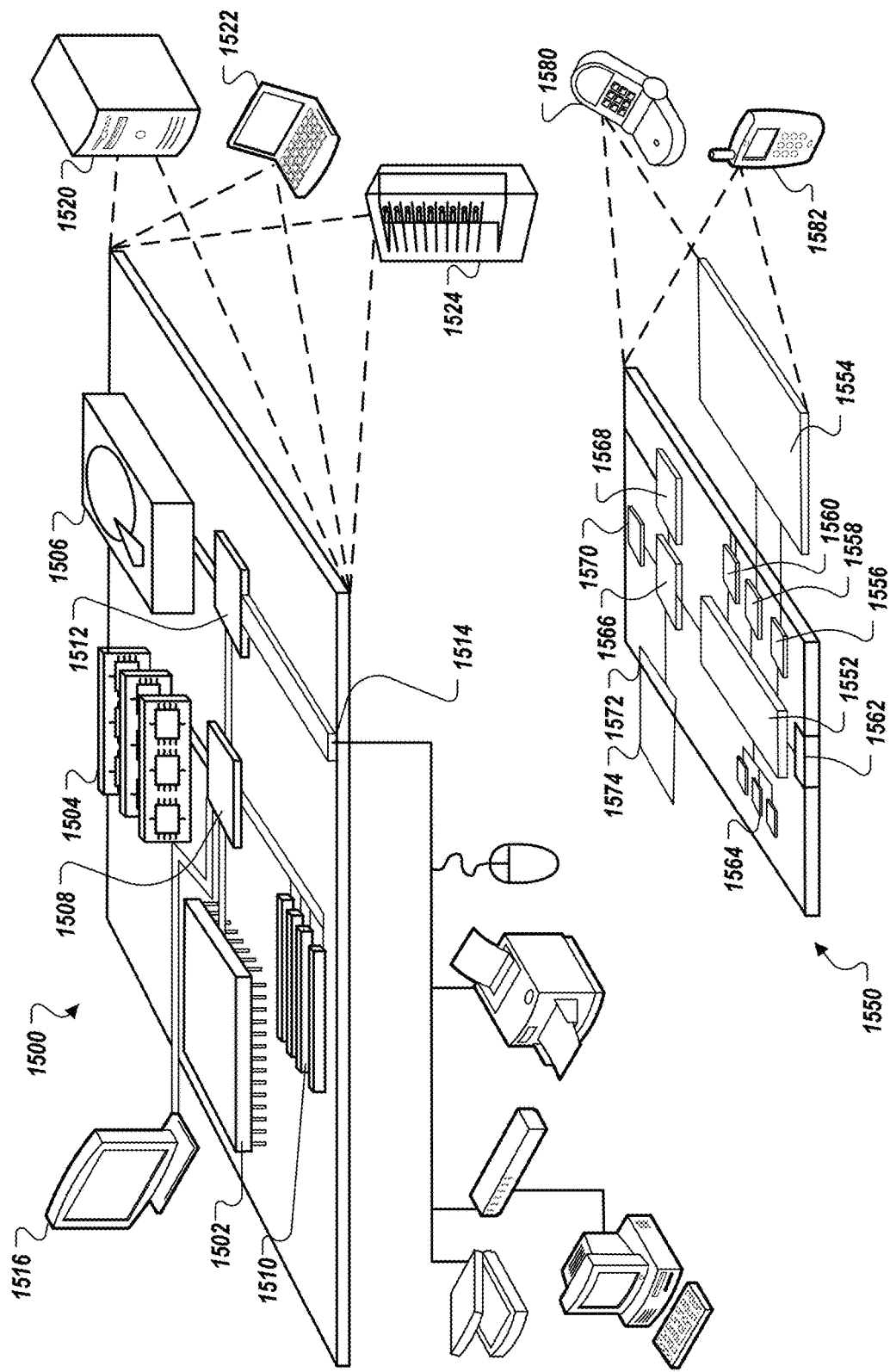
FIG. 15 is a block diagram of computing devices that may be used to implement the technology described herein.

FIG. 15 is a block diagram of computing devices 1500, 1550 that may be used to implement the systems and methods described in this document, as either a client or as a server or plurality of servers. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a computer-readable medium. In one implementation, the memory 1504 is a volatile memory unit or units. In another implementation, the memory 1504 is a non-volatile memory unit or units.

The storage device 1506 is capable of providing mass storage for the computing device 1500. In one implementation, the storage device 1506 is a computer-readable medium. In various different implementations, the storage device 1506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of duties is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can process instructions for execution within the computing device 1550, including instructions stored in the memory 1564. The processor may also include separate analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD display or an OLED display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provide, for example, for wired communication (e.g., via a docking procedure) or for wireless communication (e.g., via Bluetooth or other such technologies).

The memory 1564 stores information within the computing device 1550. In one implementation, the memory 1564 is a computer-readable medium. In one implementation, the memory 1564 is a volatile memory unit or units. In another implementation, the memory 1564 is a non-volatile memory unit or units. Expansion memory 1574 may also be provided and connected to device 1550 through expansion interface 1572, which may include, for example, a SIMM card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS receiver module 1570 may provide additional wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smartphone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method to identify an item in a storage facility to fulfill a pick request, the method comprising:
receiving, by a computing system, a request for a physical item of a particular type;
identifying, by the computing system, a set of available physical items of the particular type from among a plurality of physical items stored in a plurality of storage locations in the storage facility;
determining, by the computing system, a score for each respective available physical item of the particular type from the set of available physical items of the particular type based on multiple sub-scores specific to the respective available physical item of the particular type, to generate a set of scores corresponding to the set of available physical items of the particular type;

selecting, by the computing system, a selected physical item from among the set of available physical items of the particular type based on the selected physical item having a most favorable score from among the set of scores corresponding to the set of available physical items of the particular type;

identifying, by the computing system, a selected storage location at which the selected physical item is located; and providing, by the computing system, instructions to cause a mechanical moving system to route the selected physical item from the selected storage location to a destination picking location.

2. The computer-implemented method of claim 1, further comprising determining, by the computing system for each respective available physical item of the available physical items, a sizing sub-score of the multiple sub-scores that are used to determine the score for the respective available physical item by:
identifying, by the computing system, a size of the respective available physical item;
identifying, by the computing system, a size of a storage location of the respective available physical item;
determining, by the computing system, an amount that the size of the storage location of the respective available physical item is larger than the size of the respective available physical item; and
assigning, by the computing system, the sizing sub-score to the respective available physical item based on the amount that the size of the storage location of the respective available physical item is larger than the size of the respective available physical item, wherein the computing system is configured to assign a more favorable sizing sub-score to the respective available physical item when (i) the amount that the size of the storage location of the respective available physical item is larger than the size of the respective available physical item exceeds a particular value than when, (ii) the amount that the size of the storage location of the respective available physical item is larger than the size of the respective available physical item is less than or equal to the particular value, wherein the size of the respective available physical item falls within a range from a minimum size of the storage location of the respective available physical location to a maximum size of the respective available physical storage location.

3. The computer-implemented method of claim 1, further comprising determining for each respective available physical item of the available physical items, by the computing system, a weight sub-score of the multiple sub-scores that are used to determine the score for the respective available physical item by:
identifying, by the computing system, a weight of the respective available physical item;
identifying, by the computing system, a maximum weight capacity of a storage location of the respective available physical item;
identifying, by the computing system, an aggregate weight of items currently stored at the storage location;
determining, by the computing system, a remaining weight capacity of the storage location based on a difference between the maximum weight capacity and the aggregate weight of the items currently stored at the storage location;
determining, by the computing system, an amount that the remaining weight capacity of the storage location exceeds the weight of the respective available physical item; and
assigning, by the computing system, the weight sub-score based on the amount that the remaining weight capacity of the storage location exceeds the weight of the respective available physical item.

4. The computer implemented method of claim 3, wherein the computing system is configured to assign a more favorable weight sub-score to the respective available physical item when (i) the amount that the remaining weight capacity of the storage location exceeds the weight of the respective available physical item is greater than a particular value than when (ii) the amount that the remaining weight capacity of the storage location exceeds the weight of the respective available physical item is less than or equal to the particular value.

5. The computer-implemented method of claim 1, further comprising determining, by the computing system for each respective available physical item of the available physical items, a maximum weight sub-score of the multiple sub-scores that are used to determine the score for the respective available physical item by:
identifying, by the computing system, a weight of the respective available physical item;
identifying, by the computing system, a maximum weight capacity of a storage location of the respective available physical item;
identifying, by the computing system, a maximum number of items that can be stored at the storage location of the respective available physical item;
determining, by the computing system, a maximum weight per item based on dividing the maximum weight capacity of the storage location by the maximum number of items that can be stored at the storage location; and
assigning, by the computing system, the maximum weight sub-score to the respective available physical item based on the weight of the respective available physical item exceeding the maximum weight per item that can be stored at the storage location, wherein the computing system is configured to assign a more favorable maximum weight sub-score to the respective available physical item when (i) the weight of the respective available physical item exceeds the maximum weight per item than when, (ii) the weight of the respective available physical item is less than or equal to the maximum weight per item.

6. The computer-implemented method of claim 1, further comprising determining, by the computing system for each respective available physical item of the available physical items, a travel time sub-score of the multiple sub-scores that are used to determine the score for the respective available physical item by:
determining, by the computing system, a first projected travel time between a storage location of the respective available physical item and the destination picking location;
determining, by the computing system, a second projected travel time between another storage location of another available physical item and the destination picking location; and
assigning, by the computing system, the travel time sub-score to the respective available physical item based on the first projected travel time being less than the second projected travel time, wherein the computing system is configured to assign a more favorable travel time sub-score to the respective available physical item when (i) the first projected travel time is less than the second projected travel time than when, (ii) the first projected travel time is greater than the second projected travel time.

7. The computer-implemented method of claim 6, wherein assigning the travel time sub-score to the respective available physical item is based on (i) a wait time for storage items in a queue, (ii) a wait time for storage items at one or more lift mechanisms, (iii) a travel time for storage items in one or more lift mechanisms, (iv) a travel time for storage items through one or more mechanical moving systems, (v) an amount of traffic of storage items in the storage facility, (vi) an amount of time needed to pick the respective available physical item before routing the available physical item to the destination picking location, or (vii) an actual distance between the storage location of the respective available physical item and the destination picking location.

8. The computer-implemented method of claim 1, further comprising determining, by the computing system for each respective available physical item of the available physical items, a picking velocity sub-score of the multiple sub-scores that are used to determine the score for the respective available physical item by:
identifying, by the computing system, multiple items currently stored in a storage location of the respective available physical item;
determining, by the computing system, a statistical likelihood that each of the multiple items currently stored in the storage location is likely to be picked in the future;
determining, by the computing system, positions for each of the multiple items currently stored in the storage location, wherein the storage location has a plurality of positions, wherein each of the plurality of positions is assigned a numeric value, wherein a smaller numeric value corresponds to a position closer to a front of the storage location and a larger numeric value corresponds to a position closer to a back of the storage location;
determining, by the computing system, a picking rate of the respective available physical item;
determining, by the computing system, a position of the respective available physical item in the storage location relative to each of the multiple items currently stored in the storage location; and
assigning, by the computing system, the picking velocity sub-score to the respective available physical item based on the picking rate and the position of the respective available physical item, wherein the computing system is configured to assign a more favorable picking velocity sub-score to the respective available physical item when (i) the picking rate of the respective available physical item exceeds the statistical likelihood that each of the multiple items currently stored at the storage location is likely to be picked in the future and (ii) the position of the respective available physical item is less than the positions for each of the multiple items currently stored in the storage location than when, (iii) the picking rate of the respective available physical item exceeds the statistical likelihood that each of the multiple items currently stored at the storage location is likely to be picked in the future and (iv) the position of the respective available physical item is greater than the positions for each of the multiple items currently stored in the storage location.

9. The computer-implemented method of claim 1, further comprising determining, by the computing system for each respective available physical item of the available physical items, an item depth sub-score of the multiple sub-scores that are used to determine the score for the respective available physical item by:
identifying, by the computing system, a total quantity of items currently stored in a storage location of the respective available physical item;
determining, by the computing system, a quantity of the total quantity of items currently stored in the storage location in a queue in front of the respective available physical item; and
assigning, by the computing system, the item depth sub-score to the respective available physical item based on the quantity of items in the queue in front of the respective available physical item, wherein the computing system is configured to assign a more favorable item depth sub-score to the respective available physical item when (i) the quantity of the items in the queue in front of the respective available physical item is less than a particular value than when, (ii) the quantity of the items in the queue in front of the respective available physical items is greater than the particular value.

10. The computer-implemented method of claim 1, further comprising determining, by the computing system for each respective available physical item of the available physical items, a type sub-score of the multiple sub-scores that are used to determine the score for the respective available physical item by:
determining, by the computing system, a quantity of storage items having a same particular type as the respective available physical item that are stored at a storage location of the respective available physical item; and
assigning, by the computing system, the type sub-score to the respective available physical item based on the particular type of the respective available physical item, wherein the computing system is configured to assign a more favorable type sub-score to the respective available physical item when (i) the quantity of the storage items having the same particular type as the respective available physical item is less than a particular value than when, (ii) the quantity of the storage items having the same particular type as the respective available physical item is greater than or equal to the particular value.

11. The computer-implemented method of claim 10, wherein identifying storage items having the same particular type as the respective available physical item comprises identifying storage items having at least one of a same perishable date, storage temperature, SKU, customer identifier, product, outbound date, and delivery date as the available physical item.

12. The computer-implemented method of claim 1, further comprising determining, by the computing system for each respective available physical item of the available physical items, a fill capacity sub-score of the multiple sub-scores that are used to determine the score for the respective available physical item by:
determining, by the computing system, a quantity of storage items currently stored at a storage location of the respective available physical item;
determining, by the computing system, a total number of storage items that can be stored at the storage location of the respective available physical item;

determining, by the computing system, an amount of fill capacity for the storage location based on comparing the quantity of storage items currently stored to the total number of storage items that can be stored at the storage location; and assigning, by the computing system, the fill capacity sub-score to the respective available physical item based on the amount of fill capacity, wherein the computing system is configured to assign a more favorable fill capacity sub-score to the respective available physical item when (i) the amount of fill capacity is less than a particular value than when, (ii) the amount of fill capacity is greater than or equal to the particular value, wherein the computing system is configured to assign a most favorable fill capacity sub-score to the respective available physical item when the amount of fill capacity is 0 and assign a least favorable fill capacity sub-score to the respective available physical item when the amount of fill capacity is 100.

13. The computer-implemented method of claim 12, further comprising:
determining, by the computing system, a quantity of storage items having a same particular type as the respective available physical item that are stored at a storage location of the respective available physical item; and
assigning a more favorable fill capacity sub-score to the respective available physical item when (i) the quantity of the storage items having the same particular type as the respective available physical item is less than a first particular value and (ii) the amount of fill capacity is greater than or equal to a second particular value than when, (iii) the quantity of the storage items having the same particular type as the respective available physical item is greater than the first particular value and (iv) the amount of fill capacity is less than the second particular value.

14. The computer-implemented method of claim 13, further comprising:
identifying, by the computing system, storage items having a different type than the particular type of the respective available physical item that are currently stored at the storage location;
determining, by the computing system and for each of the different types, a quantity of the storage items of each different type; and
assigning a more favorable fill capacity sub-score to the respective available physical item when (i) a first quantity of the storage items of a first different type is less than a second quantity of the storage items of a second different type and (ii) the amount of fill capacity is greater than or equal to a particular value than when, (iii) the first quantity of the storage items of the first different type is greater than the second quantity of the storage items of the second different type and (iv) the amount of fill capacity is less than the particular value.

15. The computer-implemented method of claim 1, further comprising determining, by the computing system for each respective available physical item of the available physical items, a task quantity sub-score of the multiple sub-scores that are used to determine the score for the respective available physical item by:
identifying, by the computing system, a room where a storage location of the respective available physical item is located;
receiving, by the computing system, information about inbound and outbound tasks for a group of one or more lift mechanisms that service a group of storage locations in the identified room that includes the storage location of the respective available physical item;
determining, by the computing system and based on the information about the inbound and outbound tasks for the group of the one or more lift mechanisms, a quantity of tasks queued for the one or more lift mechanisms in the identified room; and
assigning, by the computing system, the task quantity sub-score to the respective available physical item based on the quantity of tasks queued for the one or more lift mechanisms in the identified room, wherein the computing system is configured to assign a more favorable task quantity sub-score to the respective available physical item when (i) the quantity of tasks queued for the one or more lift mechanisms in the identified room is less than a particular value than when, (ii) the quantity of tasks queued for the one or more lift mechanisms in the identified room is greater than the particular value.

16. The computer-implemented method of claim 15, wherein determining the quantity of tasks queued for the one or more lift mechanisms in the identified room comprises weighting a quantity of outbound tasks more heavily than a quantity of inbound tasks for the one or more lift mechanisms in the identified room.

17. The computer-implemented method of claim 1, further comprising determining, by the computing system for each respective available physical item of the available physical items, an aisle task sub-score of the multiple sub-scores that are used to determine the score for the respective available physical item by:
identifying, by the computing system, a room where a storage location of the respective available physical item is located;
selecting, by the computing system, an aisle in the room that is used to access the storage location of the available physical item, wherein the room includes a plurality of aisles corresponding to a plurality of levels in the room, wherein each of the plurality of aisles has one or more different storage locations;
receiving, by the computing system, information about inbound and outbound tasks for the selected aisle;
determining, by the computing system and based on the information about the inbound and outbound tasks for the selected aisle, a quantity of tasks queued for the selected aisle; and
assigning, by the computing system, the aisle task sub-score to the respective available physical item based on the quantity of tasks queued for the selected aisle, wherein the computing system is configured to assign a more favorable aisle task sub-score to the respective available physical item when (i) the quantity of tasks queued for the selected aisle is less than a particular value than when, (ii) the quantity of tasks queued for the selected aisle is greater than the particular value.

18. The computer-implemented method of claim 17, wherein assigning the aisle task sub-score to the respective available physical item is further based on (i) a number of storage items permitted in the selected aisle at a given time, (ii) sizes of storage items currently being moved in the selected aisle, (iii) weights of storage items currently being moved in the selected aisle, (iv) types of storage items currently being moved in the selected aisle, or (v) a projected traffic time in the selected aisle, wherein the projected traffic time is based at least in part on real-time traffic conditions received, by the computing system and from a plurality of sensors in the storage facility.

19. A system for identifying an item in a storage facility to fulfill a pick request, the system comprising:
    a plurality of physical items in the storage facility;
    a mechanical moving system configured to route the plurality of physical items to destination locations in the storage facility; and
    a computing system configured to:
        receive a request for a physical item of a particular type;
        identify a set of available physical items of the particular type from among the plurality of physical items stored in a plurality of storage locations in the storage facility;
        determine a score for each respective available physical item of the particular type from the set of available physical items of the particular type based on multiple sub-scores specific to the respective available physical item of the particular type, to generate a set of scores corresponding to the set of available physical items of the particular type;
        select a selected physical item from among the set of available physical items of the particular type based on the selected physical item having a most favorable score from among the set of scores corresponding to the set of available physical items of the particular type;
        identify a selected storage location at which the selected physical item is located; and
        provide instructions to cause the mechanical moving system to route the selected physical item from the selected storage location to a destination picking location.

20. The system of claim 19, wherein the computing system is further configured to determine, for each respective available physical item of the available physical items, a sizing sub-score of the multiple sub-scores that are used to determine the score for the respective available physical item by:
    identifying a size of the respective available physical item;
    identifying a size of a storage location of the respective available physical item;
    determining an amount that the size of the storage location of the respective available physical item is larger than the size of the respective available physical item; and
    assigning the sizing sub-score to the respective available physical item based on the amount that the size of the storage location of the respective available physical item is larger than the size of the respective available physical item, wherein the computing system is configured to assign a more favorable sizing sub-score to the respective available physical item when (i) the amount that the size of the storage location of the respective available physical item is larger than the size of the respective available physical item exceeds a particular value than when, (ii) the amount that the size of the storage location of the respective available physical item is larger than the size of the respective available physical item is less than or equal to the particular value, wherein the size of the respective available physical item falls within a range from a minimum size of the storage location of the respective available physical location to a maximum size of the respective available physical storage location.

21. The system of claim 19, wherein the computing system is further configured to determine, for each respective available physical item of the available physical items, a weight sub-score of the multiple sub-scores that are used to determine the score for the respective available physical item by:
    identifying a weight of the respective available physical item;
    identifying a maximum weight capacity of a storage location of the respective available physical item;
    identifying an aggregate weight of items currently stored at the storage location;
    determining a remaining weight capacity of the storage location based on a difference between the maximum weight capacity and the aggregate weight of the items currently stored at the storage location;
    determining an amount that the remaining weight capacity of the storage location exceeds the weight of the respective available physical item; and
    assigning the weight sub-score based on the amount that the remaining weight capacity of the storage location exceeds the weight of the respective available physical item.

22. The system of claim 19, wherein the computing system is further configured to determine, for each respective available physical item of the available physical items, a travel time sub-score of the multiple sub-scores that are used to determine the score for the respective available physical item by:
    determining a first projected travel time between a storage location of the respective available physical item and the destination picking location;
    determining a second projected travel time between another storage location of another available physical item and the destination picking location; and
    assigning the travel time sub-score to the respective available physical item based on the first projected travel time being less than the second projected travel time, wherein the computing system is configured to assign a more favorable travel time sub-score to the respective available physical item when (i) the first projected travel time is less than the second projected travel time than when, (ii) the first projected travel time is greater than the second projected travel time.

23. The system of claim 19, wherein the computing system is further configured to determine, for each respective available physical item of the available physical items, a picking velocity sub-score of the multiple sub-scores that are used to determine the score for the respective available physical item by:
    identifying multiple items currently stored in a storage location of the respective available physical item;
    determining a statistical likelihood that each of the multiple items currently stored in the storage location is likely to be picked in the future;
    determining positions for each of the multiple items currently stored in the storage location, wherein the storage location has a plurality of positions, wherein each of the plurality of positions is assigned a numeric value, wherein a smaller numeric value corresponds to a position closer to a front of the storage location and a larger numeric value corresponds to a position closer to a back of the storage location;
    determining a picking rate of the respective available physical item;

determining a position of the respective available physical item in the storage location relative to each of the multiple items currently stored in the storage location; and assigning the picking velocity sub-score to the respective available physical item based on the picking rate and the position of the respective available physical item, wherein the computing system is configured to assign a more favorable picking velocity sub-score to the respective available physical item when (i) the picking rate of the respective available physical item exceeds the statistical likelihood that each of the multiple items currently stored at the storage location is likely to be picked in the future and (ii) the position of the respective available physical item is less than the positions for each of the multiple items currently stored in the storage location than when, (iii) the picking rate of the respective available physical item exceeds the statistical likelihood that each of the multiple items currently stored at the storage location is likely to be picked in the future and (iv) the position of the respective available physical item is greater than the positions for each of the multiple items currently stored in the storage location.

24. The system of claim 19, wherein the computing system is further configured to determine, for each respective available physical item of the available physical items, a task quantity sub-score of the multiple sub-scores that are used to determine the score for the respective available physical item by:

identifying a room where a storage location of the respective available physical item is located;

receiving information about inbound and outbound tasks for a group of one or more lift mechanisms that service a group of storage locations in the identified room that includes the storage location of the respective available physical item;

determining, based on the information about the inbound and outbound tasks for the group of the one or more lift mechanisms, a quantity of tasks queued for the one or more lift mechanisms in the identified room; and assigning the task quantity sub-score to the respective available physical item based on the quantity of tasks queued for the one or more lift mechanisms in the identified room, wherein the computing system is configured to assign a more favorable task quantity sub-score to the respective available physical item when (i) the quantity of tasks queued for the one or more lift mechanisms in the identified room is less than a particular value than when, (ii) the quantity of tasks queued for the one or more lift mechanisms in the identified room is greater than the particular value.

25. The system of claim 19, wherein the computing system is further configured to determine, for each respective available physical item of the available physical items, an aisle task sub-score of the multiple sub-scores that are used to determine the score for the respective available physical item by:

identifying a room where a storage location of the respective available physical item is located;

selecting an aisle in the room that is used to access the storage location of the available physical item, wherein the room includes a plurality of aisles corresponding to a plurality of levels in the room, wherein each of the plurality of aisles has one or more different storage locations;

receiving information about inbound and outbound tasks for the selected aisle;

determining, based on the information about the inbound and outbound tasks for the selected aisle, a quantity of tasks queued for the selected aisle; and assigning the aisle task sub-score to the respective available physical item based on the quantity of tasks queued for the selected aisle, wherein the computing system is configured to assign a more favorable aisle task sub-score to the respective available physical item when (i) the quantity of tasks queued for the selected aisle is less than a particular value than when, (ii) the quantity of tasks queued for the selected aisle is greater than the particular value.

\* \* \* \* \*